US011874504B2

(12) United States Patent
Aksyuk et al.

(10) Patent No.: US 11,874,504 B2
(45) Date of Patent: Jan. 16, 2024

(54) OPTOELECTROMECHANICAL SWITCH AND PROGRAMMING AN OPTICAL NETWORK

(71) Applicant: Government of the United States of America, as represented by the Secretary of Commerce, Gaithersburg, MD (US)

(72) Inventors: Vladimir Anatolyevich Aksyuk, Gaithersburg, MD (US); Christian Haffner, Binningen (CH); Henri J. Lezec, Silver Spring, MD (US); Andreas Joerg, Bern (CH); Mikael Mazur, Gothenburg (SE); Daniel Chelladurai, Zurich (CH); Jueg Leuthold, Neerach (CH)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

(21) Appl. No.: 17/490,841

(22) Filed: Sep. 30, 2021

(65) Prior Publication Data

US 2022/0035225 A1 Feb. 3, 2022

Related U.S. Application Data

(60) Provisional application No. 63/058,552, filed on Jul. 30, 2020.

(51) Int. Cl.
G02B 6/35 (2006.01)
G02B 6/293 (2006.01)
(Continued)

(52) U.S. Cl.
CPC ....... *G02B 6/3536* (2013.01); *G02B 6/29341* (2013.01); *G02B 6/357* (2013.01); *G02F 1/295* (2013.01); *H04J 14/0212* (2013.01)

(58) Field of Classification Search
CPC ............ G02B 6/29338; G02B 6/29341; G02B 6/3536; G02B 6/357
See application file for complete search history.

(56) References Cited

U.S. PATENT DOCUMENTS 3,589,794 A * 6/1971 Marcatili ........... G02B 6/29338
385/39
6,363,183 B1 3/2002 Koh
(Continued)

OTHER PUBLICATIONS

C. Haffner et al. Nano-opto-electro-mechanical switches operated at CMOS-level voltages. Science, 366, 860-864, Nov. 15, 2019. (https://doi.org/10.1126/science.aay8645) (Year: 2019).*

(Continued)

*Primary Examiner* — Michael Stahl
(74) *Attorney, Agent, or Firm* — Office of Chief Counsel for National Institute of Standards and Technology

(57) ABSTRACT

Disclosed is an optoelectromechanical switch that includes: an optical feedline disposed on an isolation substrate that receives resonator light that is subject to optical communication to a resonator when a cavity length of the resonator supports an electromagnetic mode at the wavelength of the resonator light; a resonator including: a low refractive index optical layer and receives substrate electrical counter potential; a non-conductive spacer; the electrically conductive membrane and that receives a membrane electrical potential and deflects toward and away from the electrically conductive high-index optical waveguide based on a difference in potential between the membrane electrical potential and the substrate electrical counter potential; the cavity length that is variable and under electromechanical control.

11 Claims, 26 Drawing Sheets

(51) Int. Cl.
*H04J 14/02* (2006.01)
*G02F 1/295* (2006.01)

(56) References Cited

U.S. PATENT DOCUMENTS

| | | | | |
|---|---|---|---|---|
| 6,411,752 | B1* | 6/2002 | Little | G02B 6/126 385/24 |
| 6,865,314 | B1* | 3/2005 | Blair | G02B 6/12007 385/27 |
| 6,909,824 | B1* | 6/2005 | Messica | G02B 6/3536 385/27 |
| 7,043,115 | B2* | 5/2006 | Frick | G02B 6/1225 333/219.1 |
| 9,395,177 | B2* | 7/2016 | Pruessner | G01B 9/02023 |
| 10,976,493 | B2* | 4/2021 | Huang | G02B 6/12033 |
| 2003/0179998 | A1* | 9/2003 | Zhang | G02B 6/29334 385/25 |
| 2004/0022474 | A1* | 2/2004 | Lim | G02B 6/1223 385/4 |
| 2014/0338074 | A1* | 11/2014 | Aksyuk | G01Q 20/02 850/6 |
| 2016/0327818 | A1* | 11/2016 | Vo | G02B 6/12007 |
| 2022/0334058 | A1* | 10/2022 | Ottonello Briano | G01N 21/35 |

OTHER PUBLICATIONS

S.M.C. Abdulla et al. Tuning a racetrack ring resonator by an integrated dielectric MEMS cantilever. Optics Express, 19:17, 15864-15878, Aug. 15, 2011. (https://doi.org/10.1364/OE.19.015864) (Year: 2011).*

NIST. "What a switch! NIST-led team develops tiny low-energy device to rapidly reroute light in computer chips". Retrieved via https://www.nist.gov/news-events/news/2019/11/what-switch-nist-led-team-develops-tiny-low-energy-device-rapidly-reroute. Article dated Nov. 14, 2019. (Year: 2019).*

* cited by examiner

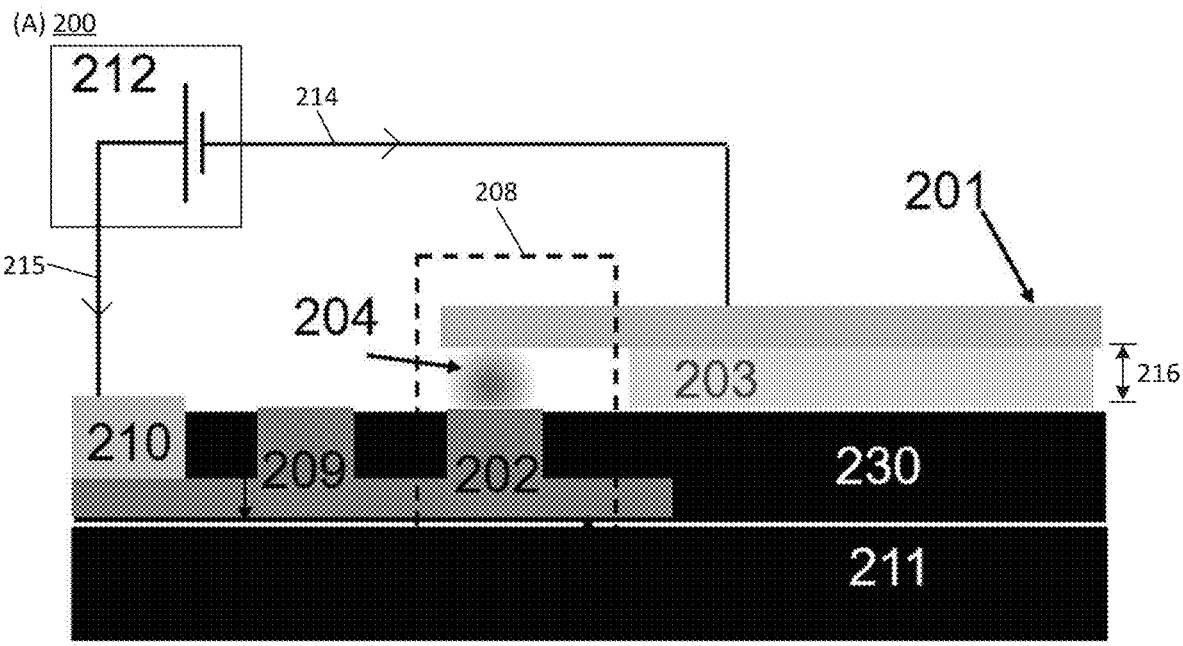
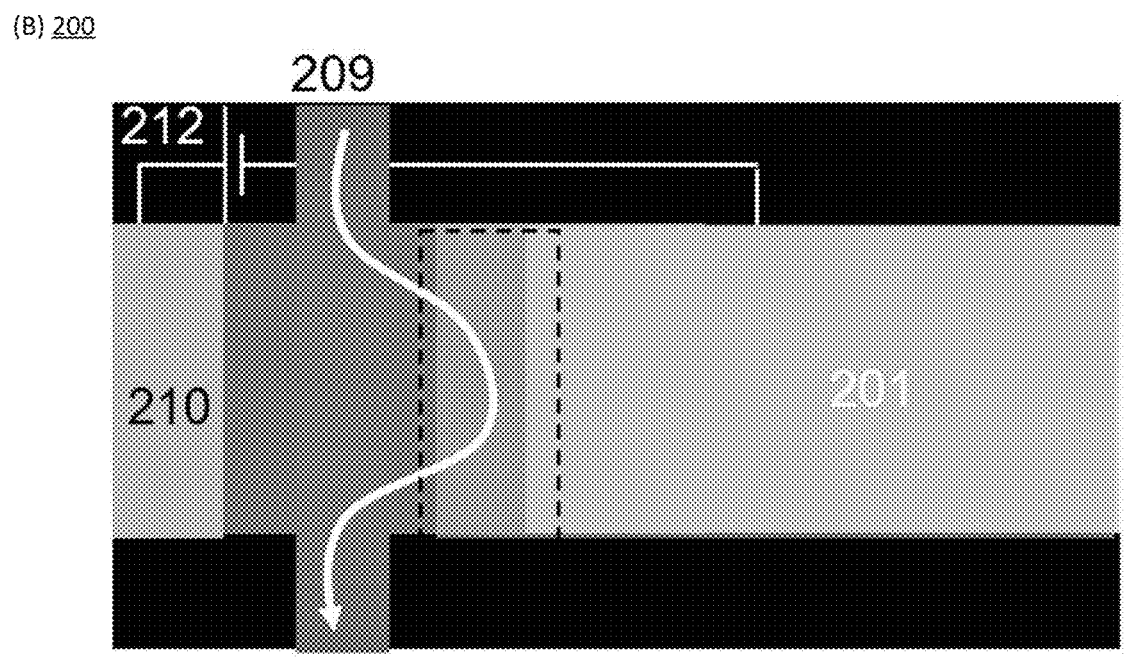
FIG. 2

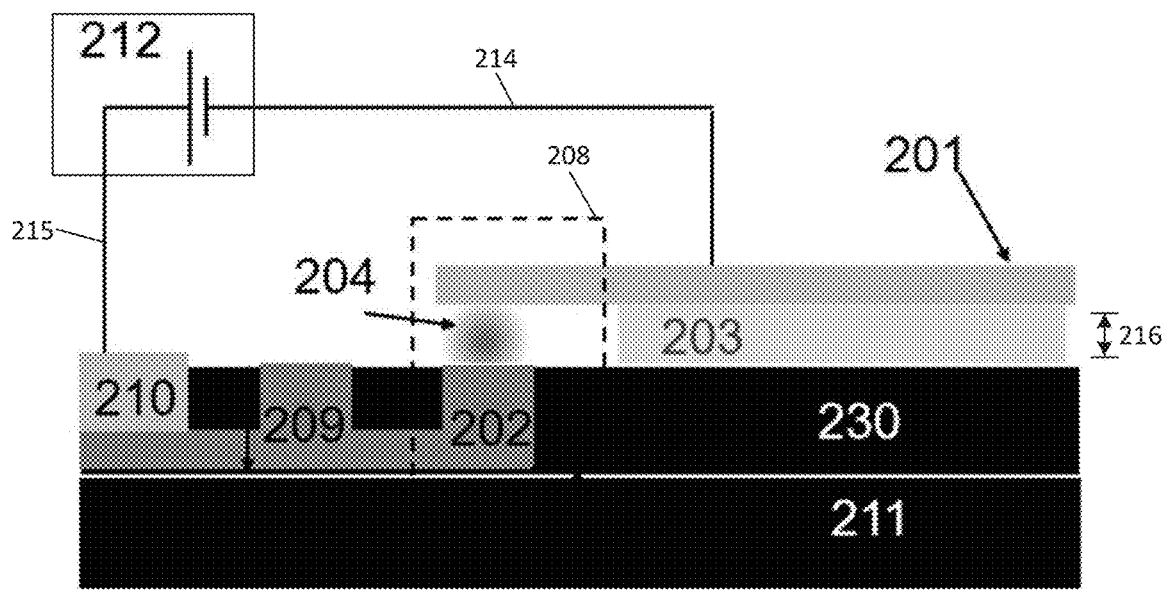
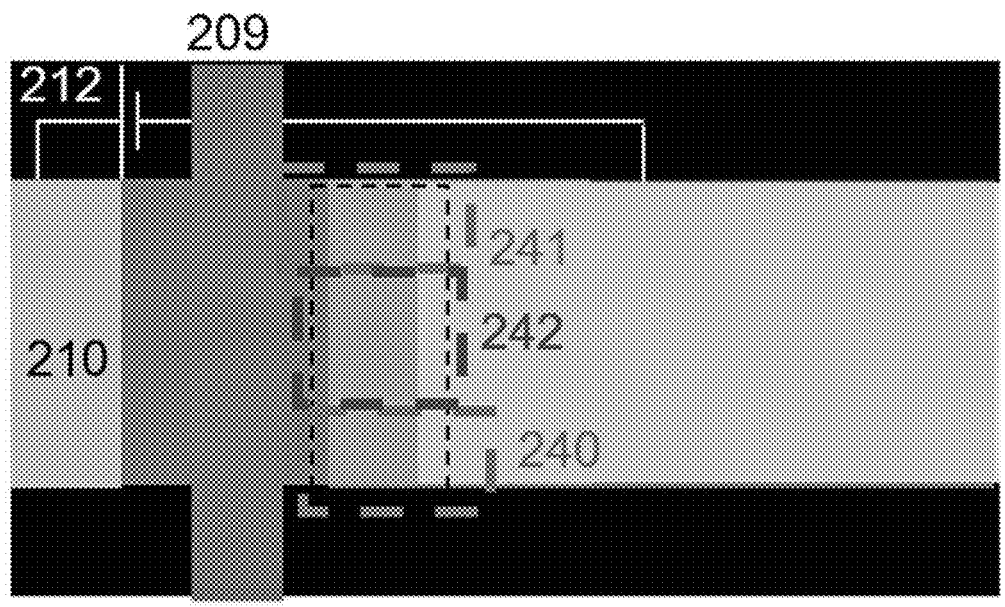
FIG. 4

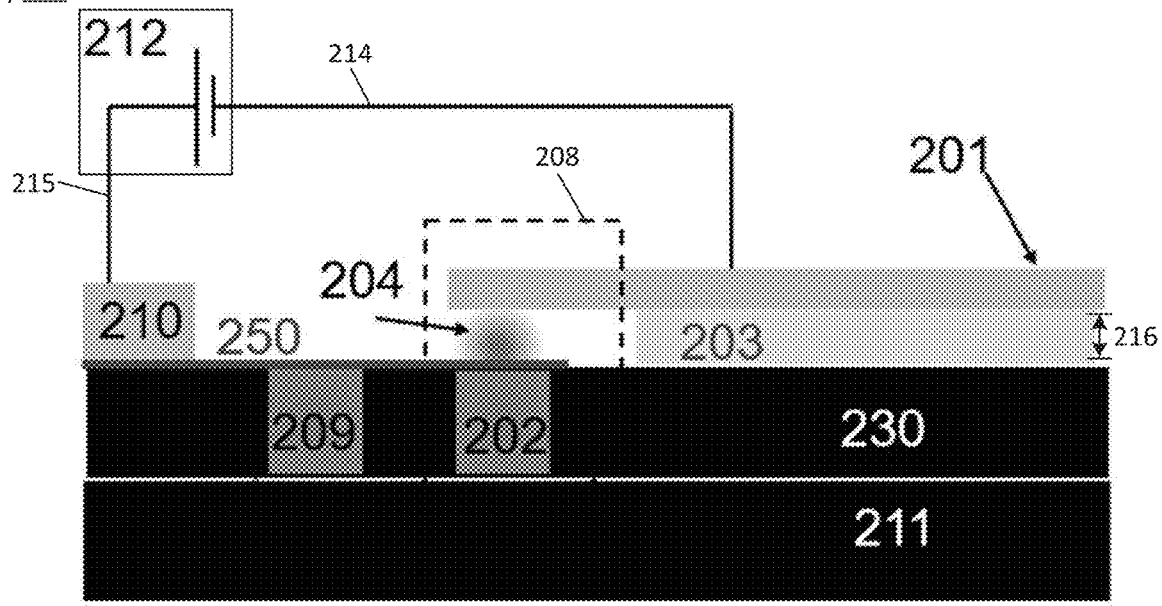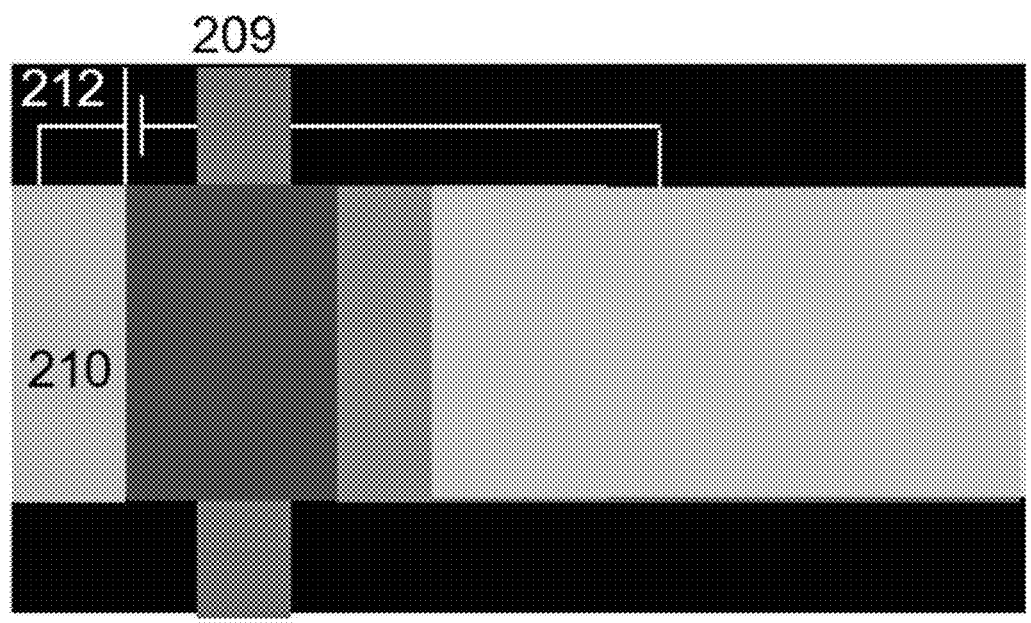
FIG. 5

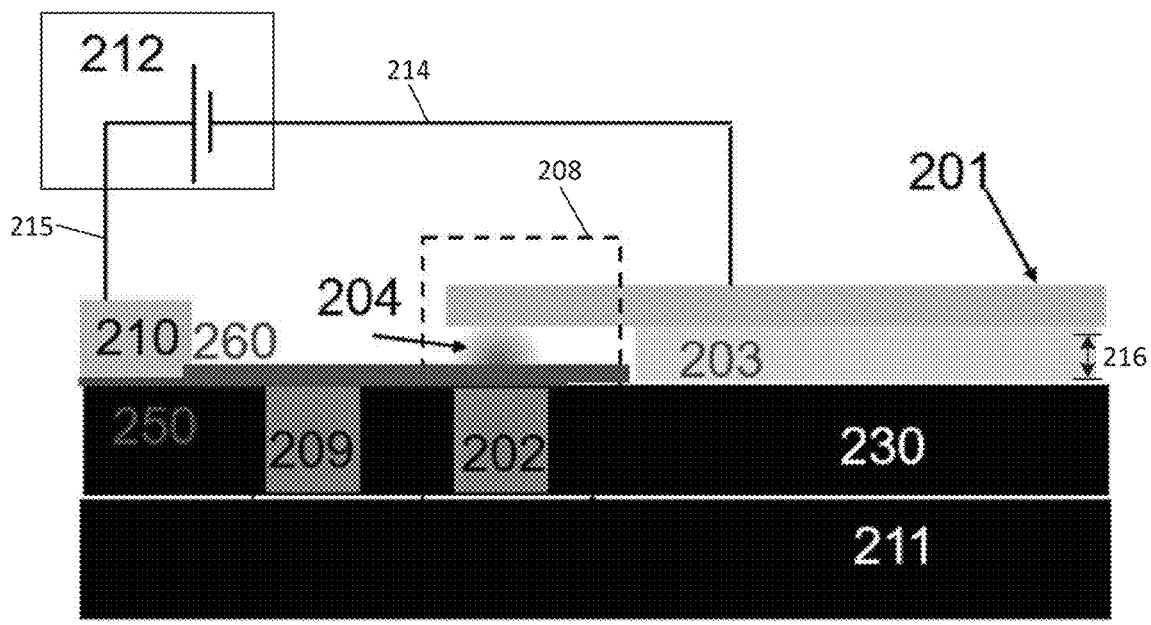
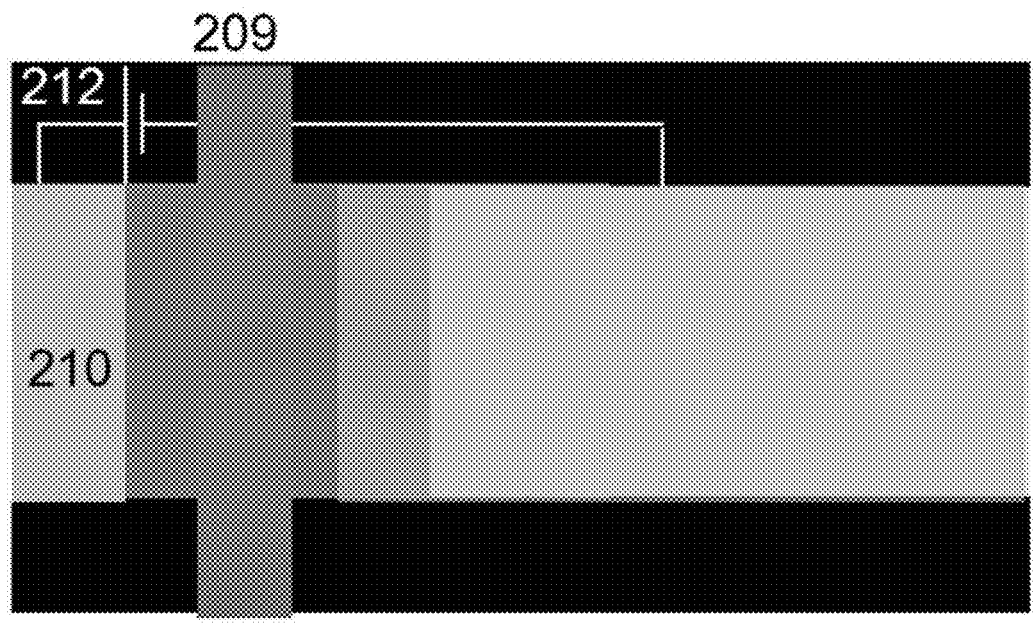
FIG. 6

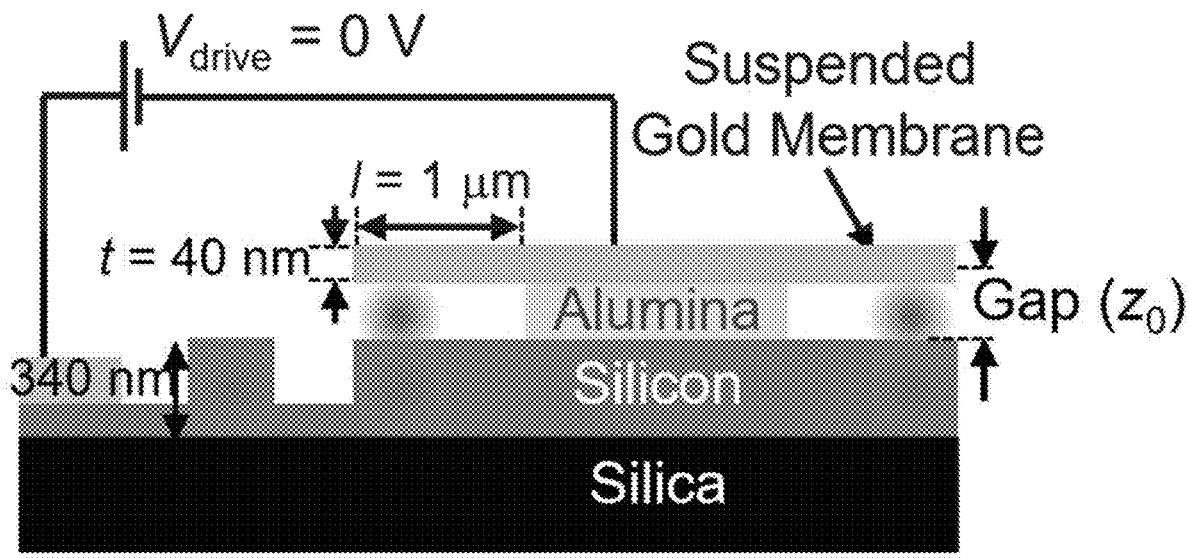
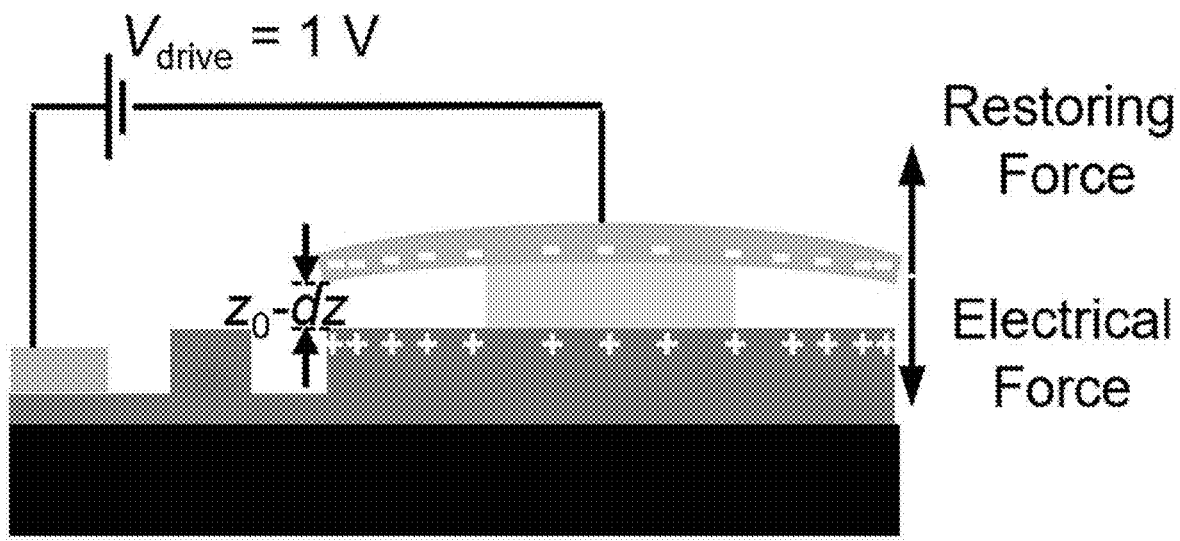
FIG. 8

| Experiment | | |
|---|---|---|
| Parameters | | |
| doping | $10^{15}$ cm$^{-3}$ p-doped | $10^{18}$ cm$^{-3}$ n-doped |
| $l$ | ≈500 nm and ≈ 1000 nm | ≈1000 nm |
| $t$ | ≈ 40 nm | ≈ 40 nm |
| $z_0$ | ≈ 55 nm | ≈ 35 nm |
| $R$ | ≈ 2000 nm | ≈ 2000 nm |
| $w$ | ≈ 50 nm-190 nm | ≈ 120 nm -140 nm |
| $h_{Si,Disc}$ | ≈ 340 nm | ≈ 340 nm |
| $n_{doping}$ | p-type: ≈ $10^{15}$ cm$^{-3}$ | n-type: $5 \times 10^{18}$ cm$^{-3}$ |
| Electrodes (Signal/Ground) | Gold/Gold | Gold/Nickel |
| $h_{Si,WG}$ | ≈ 340 nm | ≈ 340 nm |
| $w_{Si,WG}$ | ≈ 300 nm | ≈ 300 nm |

| Simulations | |
|---|---|
| $\varepsilon_{Si}$ | 11.9 |
| $\varepsilon_{Air}$ | 1 |
| $\varepsilon_{SiO_2}$ | 2.07 |
| $\varepsilon_{Au}$ | Ref. (42) |
| $\varepsilon_{Al_2O_3}$ | 3.05 |
| $E_{Young's\ modulus,\ Au}$ | 70 GPa |
| $\rho_{Au}$ | 19000 kgm$^{-3}$ |

OPTOELECTROMECHANICAL SWITCH AND PROGRAMMING AN OPTICAL NETWORK

CROSS REFERENCE TO RELATED APPLICATIONS

This application claims the benefit of U.S. Provisional Patent Application Ser. No. 63/058,552 (filed Jul. 30, 2020), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is an optoelectromechanical switch for programming an optical network, the optoelectromechanical switch comprising: an isolation substrate; an optical feedline disposed on the isolation substrate in optical communication with an electrically conductive high-index optical waveguide and that receives resonator light that is subject to optical communication to a resonator when a cavity length of the resonator supports an electromagnetic mode at the wavelength of the resonator light; a resonator comprising: a low refractive index optical layer disposed on the isolation substrate, comprising an electrically conductive high-index optical waveguide that: receives the resonator light from optical feedline when the cavity length of the resonator supports an electromagnetic mode at the wavelength of the resonator light, does not receive the resonator light from optical feedline when the cavity length of the resonator does not support an electromagnetic mode at the wavelength of the resonator light, and receives substrate electrical counter potential to be electrically biased at the substrate electrical counter potential; a non-conductive spacer disposed on the low refractive index optical layer and that spaces apart the electrically conductive high-index optical waveguide from an electrically conductive membrane to provide a cavity length of the resonator; the electrically conductive membrane disposed on the non-conductive spacer, such that that non-conductive spacer is interposed between the low refractive index optical layer and the electrically conductive membrane, such that the electrically conductive membrane: receives a membrane electrical potential to be electrically biased at the substrate electrical counter potential, and deflects toward and away from the electrically conductive high-index optical waveguide based on a difference in potential between the membrane electrical potential and the substrate electrical counter potential; the cavity length that is variable and under electromechanical control of the deflection of the electrically conductive membrane based on the difference between the membrane electrical potential and the substrate electrical counter potential.

Disclosed is a process for programming an optical network with an optoelectromechanical switch, the process comprising: receiving, by the optical feedline, resonator light; electrically biasing the low refractive index optical layer at the substrate electrical counter potential; electrically biasing the electrically conductive membrane at the membrane electrical potential; changing the cavity length based on the potential difference between the membrane electrical potential of the electrically conductive membrane and the substrate electrical counter potential of the low refractive index optical layer; and optically communicating the resonator light from the optical feedline to the resonator when the cavity length of the resonator supports an electromagnetic mode at the wavelength of the resonator light.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

FIG. 2 shows an optoelectromechanical switch with a phase shifter in (A) cross-section and (B) plan view for a phase shifter configuration, according to some embodiments.

FIG. 4 shows an optoelectromechanical switch with a linear cavity in (A) cross-section and (B) plan view, according to some embodiments.

FIG. 5 shows an optoelectromechanical switch with a two-dimensional material electrode in (A) cross-section and (B) plan view, according to some embodiments.

FIG. 6 shows an optoelectromechanical switch in (A) cross-section and (B) plan view, according to some embodiments.

FIG. 8 shows operating mechanism of plasmonic NOEM networks, wherein (A) HPP disc resonators (radius 2 µm) are formed by a thin gold membrane suspended above a silicon disc forming a gap ($z_0$). (B) Doped silicon and gold bridges are used to apply a voltage across the gap, thus inducing an electrostatic force that bends the membrane and prevents light from coupling to the resonator, according to the Example.

FIG. 25 lists design parameters and material properties used in the calculations/simulations, according to the Example.

DETAILED DESCRIPTION

Figure 1:
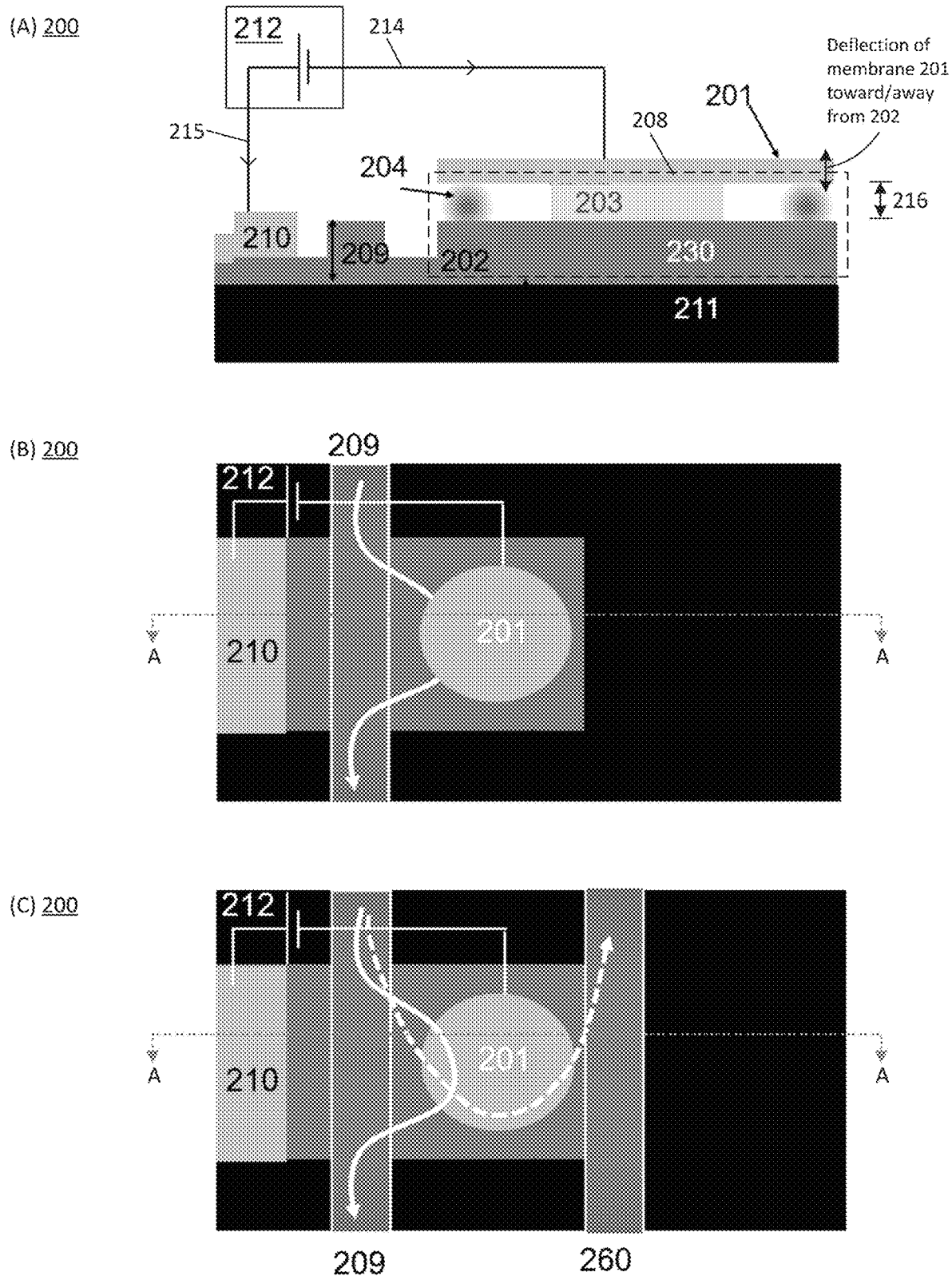
FIG. 1 shows an optoelectromechanical switch with a disc resonator in (A) cross-section, (B) plan view for a notch filter configuration, and (C) plan view for a routing switch configuration, according to some embodiments.

A detailed description of one or more embodiments is presented herein by way of exemplification and not limitation.

Nano optoelectromechanical waveguide switches include nano electromechanical actuators and optical waveguide networks on a light wave circuit platform. The nano optoelectromechanical waveguide switch is applicable to components and devices for dense wavelength division multiplexing (DWDM) optical networks such as optical cross-connect (OXC) switches and optical add/drop multiplexers (OADM). The nano optoelectromechanical waveguide switch integrates nano electromechanical actuators and high-bandwidth waveguide networks on light wave circuit that can be formed by nano deposition and lithographic batch processing techniques.

Over the past several years, the rapidly increasing traffic volumes carried by telecommunication networks have been observed as a result of the bandwidth-intensive applications such as Internet access, electronic commerce, multimedia applications, and distributed computing. Optical telecommunication systems employing optical fibers as the transmission medium have exhibited a superior performance/cost ratio for both long-haul and short-haul routes compared to any other type of telecommunication systems. In particular the emerging dense wavelength-division multiplexing (DWDM) and all-optical network communication systems have shown a way to provide high-speed and large-bandwidth network services at low cost for both long-haul and metropolitan networks. As the DWDM networks are deployed, it becomes necessary to improve the delay, bandwidth, and connectivity of optical telecommunication networks, as the information system's subscriber growth continues unrestrained.

Although telecommunication service providers have increasingly deployed fiber optic cables for both long-haul and short-haul routes, the ever-increasing network traffic has created some constraints on communication network in terms of speed, capacity, and connectivity of networks. Telecommunication service providers generally address these speed, capacity and connectivity constraints by either installing new fiber cables or by expanding the transmission capacity using faster devices or DWDM techniques. The formal method is quite expensive and difficult, as it requires a huge investment as well as constant upgrade of the existing fiber network infrastructures. In the latter methods, the DWDM increases the number of optical signals, called channels, transmitted simultaneously on a single fiber, whereas the time-division multiplexing (TDM) increases the transmission speed of optical signals. The DWDM is ideal for high-capacity networks such as point-to-point or backbone ring networks with minimal switching and routing requirements. However, in the emerging DWDM metropolitan and local area networks, the major concern is not the network capacity but the reconfigurable network connectivity. In any way, for both DWDM and TDM methods, the fiber optic switching will become a major issue for optical telecommunication systems. Ever since the fiber optic telecommunication technology was first available, many network managers preferred all-optical network due to its benefits in terms of bandwidth, security, and segment length. The OXC networks can also improve the efficiency of all-optical network by providing a "transparency" to modulation format, protocol and signal bit rates. Without the all-optical networks, the signals of telecommunication networks must be converted from optical to electrical form at switching ports and the routing information in the information packet should be analyzed and utilized for a propel signal routing. Then the signal must be converted to the optical form for a subsequent signal routing and transmission. These optical-to-electrical and optical-to-electrical signal form conversions reduce the over-all network efficiencies as it introduces delays and noises.

The DWDM network is an enabling technology for Internet applications, as the expectations of the Internet's great potential will not be realized without the bandwidth gain provide by DWDM. Direct fiber optic switching without electrical-to-optical or optical-to-electrical conversions is much needed for the all-optical DWDM network. The unprecedented record of growth being generated by Internet traffic and a tremendous amount of data being dumped on the public network show no sign of slowing yet. Without optical telecommunication network and optical fiber's enormous bandwidth potential, the Internet performance will be significantly slowed as the subscriber growth increases unrestrained. Notably there is a need for fiber optic switches for all-optical DWDM networks, which can provide low cost, small crosstalk, reliable, compact, reconfigurable, modular, scalable, high speed, and wavelength/polarization insensitive characteristics.

Combining reprogrammable optical networks with CMOS electronics is expected to provide a platform for technological developments in on-chip integrated optoelectronics. It has been discovered that an optoelectromechanical switch and programming an optical network described herein provide opto-electro-mechanical effects in micrometer-scale hybrid-photonic-plasmonic structures for light switching under CMOS voltages and low optical losses (0.1 dB). Rapid (e.g., tens of nanoseconds) switching is achieved by an electrostatic, nanometer-scale perturbation of a thin, and thus low-mass, gold membrane that forms an air-gap hybrid-photonic-plasmonic waveguide. Confinement of the plasmonic portion of the light to the variable-height air gap yields a strong opto-electro-mechanical effect, while photonic confinement of the rest of the light minimizes optical losses. The demonstrated hybrid architecture provides a route to develop for the first time applications for CMOS-integrated, reprogrammable optical systems such as optical neural networks for deep learning.

Compact and energy-efficient programmable optical networks (PON) can extend electrical information processing networks by new functionalities such as optical neural networks used for pattern recognition at the speed of light (e.g. cancer screening); all-optical data routing in server farms, and integrated optical circuits to miniaturize tabletop quantum systems to microchip size. In optics, light is manipulated to transmit information million times faster than electronics, while promising minimal heat dissipation. Heating is a major issue for existing data center and integrated circuits. A challenge is that information can be effectively stored electrically, and thus PONs need to be co-integrated with electronics. This co-integration is challenging as the latter has matured over decades, and transistors are approaching the atomic level. Contrarily, thermo-electro-optical switching units are millimeters long and dissipate intolerable level of heat even in standby. To enable PON, micrometer sized electro-optic switches are needed that can be reprogrammed using the limited CMOS voltage-levels provided by electronics, while keeping optical losses at a minimum.

The optoelectromechanical switch provides an electro-optical switching element that meets these requirements by leveraging opto-electro-mechanical (OEM) effects in a hybrid-photonic-plasmonic configuration. In the optoelectromechanical switch, a silicon waveguide is placed in nanometer-scale vicinity of an ultrathin (i.e. low-mass) gold membrane, and light that is guided in this structure forms a hybrid-photonic-plasmonic mode. The architecture of the optoelectromechanical switch provides advantages over conventional devices that allows complete switching (i.e., reprogram) the flow of light between various outputs by electrostatically inducing a nanometer-scale perturbation of the membrane position. This results in record performance in terms of light-matter interaction, optical loss, driving voltage, switching time, and footprint.

In the optoelectromechanical switch, plasmonic confinement provided by the hybrid mode strongly enhances the mechanically induced light-matter interaction. Furthermore, utilizing plasmonics in combination with the photonic semiconductor enables the waveguide integration of the driving electrodes that are only spaced tens of nanometers apart. The nanometer-scale spacing and strong opto-mechanical coupling enables that CMOS voltage-levels provide sufficient actuation for complete opto-electro-mechanical switching between destructive and constructive interference. In certain configurations, the optoelectromechanical switch has a voltage-length product of $(27\pm4)$ V$\mu$m.

The optoelectromechanical switch provides strong light-matter interaction with a voltage-length-product of 80 V μm with a low-loss hybrid-photonic-plasmonic waveguide architecture, which lowers Ohmic losses by two orders of magnitude (~0.01 dB/μm), while providing a light-matter interaction beyond that of all-plasmonic approaches as afforded by the low permittivity of the air that fills the gap between the gold membrane and silicon waveguide. The low permittivity maximizes optical field at the metal surface (i.e., light-matter interaction) and minimizes light penetration into the metal (i.e., Ohmic loss). The optoelectromechanical switch has low Ohmic loss in a compact plasmonic resonators having Q-factors of 7000. The optoelectromechanical switch can have a device loss of 0.1 dB and seta new benchmark compared to the prior loss record of 2.5 dB. The strong light-matter interaction in combination with the resonant enhancement provided by optoelectromechanical switch allows the physical structural volume of the actuating element to shrink to a third of $\lambda^3$. This results in a low mass actuator in the optoelectromechanical switch that enables a dynamic response of tens of nanoseconds, instead of having a microsecond response.

The optoelectromechanical switch can be used in an optical neural network, autonomous driving via LiDAR, and quantum information processing. The optoelectromechanical switch overcomes deficiencies in conventional OEM switches that are too slow, bulky, and involve high driving voltages (tens of volts) and overcomes Ohmic losses such that the optoelectromechanical switch plasmonics is practical for implementations in large-scale optical networks that includes hundreds of electro-optic elements.

Optoelectromechanical switch 200 can program an optical network. In an embodiment, with reference to FIG. 1, FIG. 2, FIG. 3, FIG. 4, FIG. 5, FIG. 6, FIG. 7, and FIG. 8, optoelectromechanical switch 200 includes: isolation substrate 211; optical feedline 209 disposed on isolation substrate 211 in optical communication with electrically conductive high-index optical waveguide 202 and that receives resonator light that is subject to optical communication to resonator 208 when cavity length 216 of resonator 208 supports an electromagnetic mode at the wavelength of the resonator light; resonator 208 including: low refractive index optical layer 230 disposed on isolation substrate 211, including electrically conductive high-index optical waveguide 202 that: receives the resonator light from optical feedline 209 when cavity length 216 of resonator 208 supports an electromagnetic mode at the wavelength of the resonator light, does not receive the resonator light from optical feedline 209 when the cavity length of resonator 208 does not support an electromagnetic mode at the wavelength of the resonator light, and receives substrate electrical counter potential 215 to be electrically biased at substrate electrical counter potential 215; non-conductive spacer 203 disposed on low refractive index optical layer 230 and that spaces apart electrically conductive high-index optical waveguide 202 from electrically conductive membrane 201 to provide a cavity length of resonator 208; electrically conductive membrane 201 disposed on non-conductive spacer 203, such that non-conductive spacer 203 is interposed between low refractive index optical layer 230 and electrically conductive membrane 201, such that electrically conductive membrane 201: receives membrane electrical potential 214 to be electrically biased at substrate electrical counter potential 215, and deflects toward and away from electrically conductive high-index optical waveguide 202 based on a difference in potential between membrane electrical potential 214 and substrate electrical counter potential 215; cavity length 216 that is variable and under electromechanical control of the deflection of electrically conductive membrane 201 based on the difference between membrane electrical potential 214 and substrate electrical counter potential 215.

In an embodiment, optoelectromechanical switch 200 further includes power source 212 in communication with low refractive index optical layer 230 and electrically conductive membrane 201 and that provides membrane electrical potential 214 to electrically conductive membrane 201 and substrate electrical counter potential 215 to low refractive index optical layer 230.

In an embodiment, optoelectromechanical switch 200 includes counter electrode 210 disposed on isolation substrate 211 and in electrical communication with low refractive index optical layer 230 and that receives substrate electrical counter potential 215 and communicates substrate electrical counter potential 215 to low refractive index optical layer 230.

In an embodiment, electrically conductive membrane 201 includes a plasmonic metal. In an embodiment, the plasmonic metal includes gold, copper, silicon, aluminum, or tin.

In an embodiment, low refractive index optical layer 230 includes silicon.

In an embodiment, resonator 208 is configured as a ring resonator, linear resonator, or a phase shifter.

In an embodiment, optical feedline 209 comprises a high-k dielectric such as a group III or IV element from the periodic table such as InP, SiO, SiN, Si, Ge, and the like.

In an embodiment, optoelectromechanical switch 200 includes conductive two-dimensional electrode 250 disposed on low refractive index optical layer 230 and that receives substrate electrical counter potential 215 and capacitively couples to electrically conductive membrane 201.

In an embodiment, optoelectromechanical switch 200 includes high-k member 260 disposed on conductive two-dimensional electrode 250 and is interposed between conductive two-dimensional electrode 250 and electrically conductive membrane 201.

Isolation substrate 211 provides electrical and optical isolation so an optical mode does not leak from electrically conductive high-index optical waveguide 202 and can be, e.g., an SOI substrate that has a refractive index that is smaller than that of low refractive index optical layer 230.

In an embodiment, a process for programming an optical network with optoelectromechanical switch 200 includes: receiving, by optical feedline 209, resonator light; electrically biasing low refractive index optical layer 230 at substrate electrical counter potential 215; electrically biasing electrically conductive membrane 201 at membrane electrical potential 214; changing cavity length 216 based on the potential difference between membrane electrical potential 214 of electrically conductive membrane 201 and substrate electrical counter potential 215 of low refractive index optical layer 230; and optically communicating the resonator light from optical feedline 209 to resonator 208 when cavity length 216 of resonator 208 supports an electromagnetic mode at the wavelength of the resonator light.

Optoelectromechanical switch 200 can be made in various ways. It should be appreciated that optoelectromechanical switch 200 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, optoelectromechanical switch 200 can be disposed in a terrestrial environment or space environment. Elements of optoelectromechanical switch 200 can be formed from silicon, silicon nitride, and the like although other suitable materials, such ceramic, glass, or metal can be used. According to an embodiment, the elements of optoelectromechanical switch 200 are formed using 3D printing although the elements of optoelectromechanical switch 200 can be formed using other methods, such as injection molding or machining a stock material such as block of material that is subjected to removal of material such as by cutting, laser oblation, and the like. Accordingly, optoelectromechanical switch 200 can be made by additive or subtractive manufacturing. In an embodiment, elements of optoelectromechanical switch 200 are selectively etched to remove various different materials using different etchants and photolithographic masks and procedures. The various layers thus formed can be subjected to joining by bonding to form optoelectromechanical switch 200.

It is contemplated that optoelectromechanical switch 200 can be configured as a notch filter (e.g., a kill switch), wherein mechanical actuation allows catch light in the resonator (e.g., a disc or ring resonator) upon applying a potential across cavity length 216. A different voltage allows the light to pass by the resonator as shown in panel B of FIG. 1. The optoelectromechanical switch 200 can include a drop port 260 as shown in FIG. 1B, wherein mechanical actuation allows switching between feed line 209 and drop port 260.

With reference to FIG. 2, optoelectromechanical switch 200 can be configured as a phase shifter, wherein light concentrates in the section of strongest mechanical actuation (air gap 204). Waveguides 202 and 209 are buried within a low refractive index material (low refractive index optical layer 230). This material can be the same as the substrate 211. Resonator light couples from optical feedline 209 to electrically conductive high-index optical waveguide 202 (white arrow). In various embodiments, the coupling can be realized via a directional coupler, tapered coupler (adiabatic), or butt coupling. Within the opto-electro-mechanical phase shifting element, resonator light experience phase shift upon applying an electrical signal via (power source 212) via the plasmonic-opto-electro-mechanical effect. Actuation of electrically conductive membrane 201 to reduce gap 204.

Figure 3:
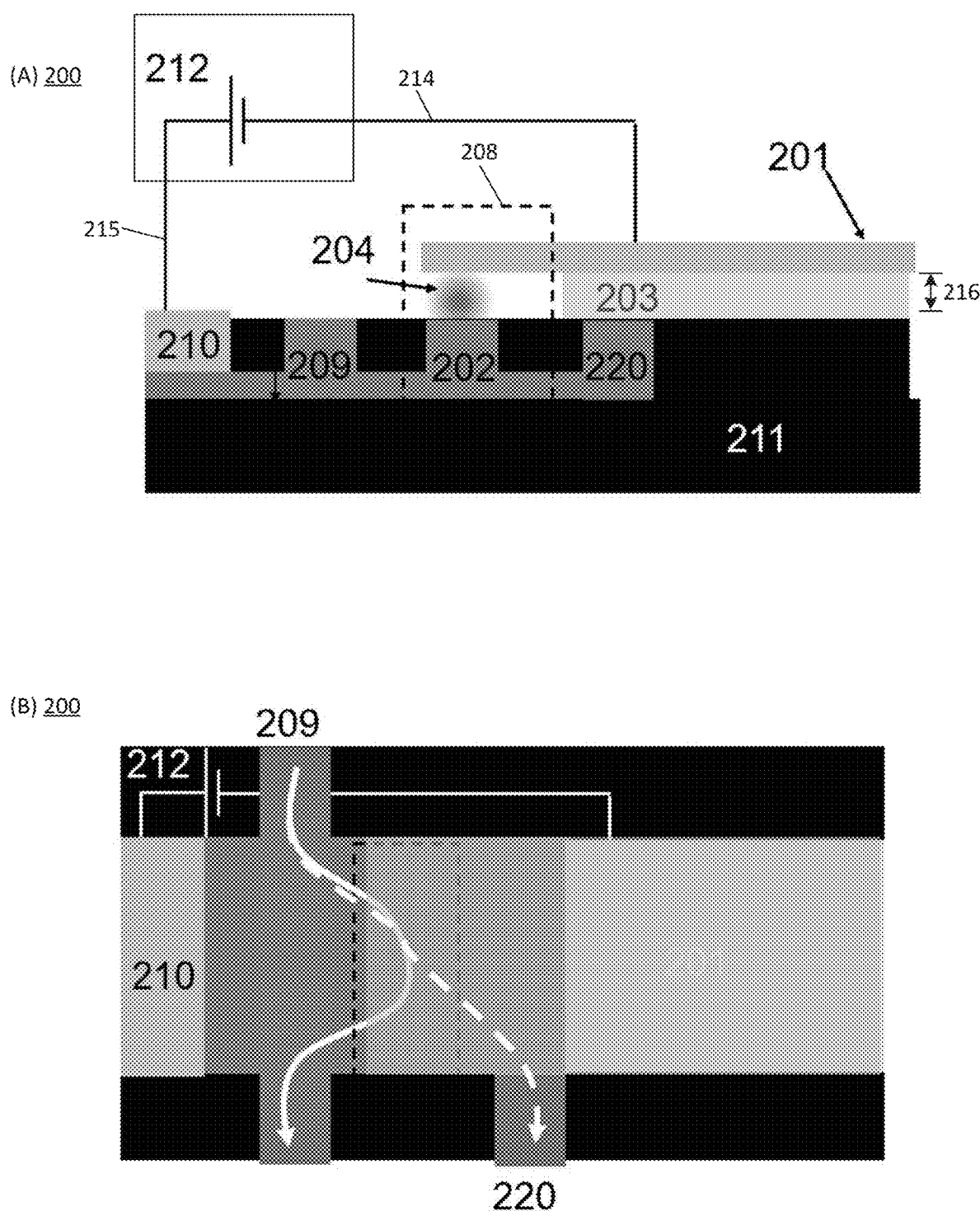
FIG. 3 shows an optoelectromechanical switch with a phase shifter in (A) cross-section and (B) plan view, according to some embodiments.

With reference to FIG. 3, optoelectromechanical switch 200 is configured as a phase shifter to route light between add port 209 (also referred to as a feedline 209) and optional drop port 220. Resonator light couples from add port 209 to electrically conductive high-index optical waveguide 202 and back (solid white line). Upon applying an electrical signal light, the property of the light modes changes and are coupled to electrically conductive high-index optical waveguide 202 at drop port 220 (dashed solid white line).

With reference to FIG. 4, optoelectromechanical switch 200 is in a linear cavity configuration. A resonator connector can be part or represents linear cavity 242 that is formed by two optical mirror elements (indicated as 240, 241). Optoelectromechanical actuation changes the cavity's resonant frequency, and provides a notch filter operation (kill switch). Coupling to and from the cavity can be realized via directional or but coupling. Another drop-port, e.g., as in FIG. 3, can be including to provide a routing switch.

With reference to FIG. 5, optoelectromechanical switch 200 can include conductive two-dimensional electrode 250. Conductive 2D material 250 can apply the electrical signal generated at power source 212 to the capacitor formed by conductive 2D material 250 and electrically conductive membrane 201. Charging of the gap capacitor induces an electro-mechanical actuation that reduces gap 216 and changes the phase of the light. The optical plasmonic mode (light 207) is polarized orthogonal to the 2D material and does not suffer from noticeable excess losses induced from the 2D material. It should be appreciated that, contrary to the electrically conductive high index material (202), the graphene (that can constitute conductive two-dimensional electrode 250) is conductive at cryogenic temperatures. Accordingly, optoelectromechanical switch 200 can operate at a cryogenic temperature. Fully etched waveguides can be used in this configuration. Thin films of transparent conductive oxides can be used for conductive two-dimensional electrode 250. These technique can be applied for a resonant or non-resonant operation of optoelectromechanical switch 200. This realizes the same optical function as a bent disc or ring shape of a circular resonator.

With reference to FIG. 5, optoelectromechanical switch 200 can have a performance that is enhanced by including high-k materials to increase the electrical potential present at a surface of electrically conductive membrane 201, wherein optoelectromechanical switch 200 can be operated under resonant or non-resonant conditions.

The articles and processes herein are illustrated further by the following Example, which is non-limiting.

EXAMPLE

Nano-Opto-Electro-Mechanical Switches Operated at CMOS-Level Voltages

Reprogrammable optical networks that operate in symbiosis with CMOS electronics are expected to trigger technological advancements such as optical neural networks. However, conventional electro-optical switching technologies fail to combine CMOS-level voltages, micrometer-scale footprints, nanosecond switching and minimal optical losses. Optoelectromechanical effects in micrometer-scale hybrid-photonic-plasmonic structures provide full switching capability under CMOS voltages and 0.1 dB optical losses. The plasmonic confinement of light to the location of mechanical actuation enables a strong opto-electro-mechanical effect ($G_{EOM} \approx 1.25$ THz/V) resulting in voltage-length-products of (27±4) µm, while the combination with photonics guarantees lowest optical losses (0.026±0.002) dB/µm. Furthermore, the nanometer-scale skin depth in plasmonic metals, allows reduction of the actuation to a 40 nm thin gold membrane of low mass resulting in nanosecond-scale switching. Our work demonstrates that plasmonics provides an alternative to photonics even for applications such as reprogrammable optical networks, where minimizing optical losses is of utmost most importance.

Electrically reconfigurable photonic networks are enabling technologically in many fields such as optical neural networks used to process information with low power at the speed of light; optical metrology to feed multiple sensors with a single light source; all-optical routing to avoid the current bottleneck of optical-electrical-optical conversion, and integrated quantum optical circuits. However, to make such reconfigurable photonic networks, they need to be up-scaled into large circuits and co-integrated with complementary metal-oxide semiconductor (CMOS) electronics. To achieve this level of scaling and integration, the elementary electro-optical switch unit needs to feature compact footprints (~1 µm²), CMOS driving voltages of ~1

V, fast switching (~1 ns), low optical losses (≤0.1 dB) and low power consumption (<<1 mW).

Electro-optical switches can rely on interferometric waveguide configurations to divert light to different outputs via constructive or destructive interference. This is achieved by changing the refractive index (Δn) of the waveguide material. Networks control Δn by the electro-thermo-optical effect. The milliwatt power consumption per switch in stand-by limits the scalability of this approach. Furthermore, all-optical, phase-change, and electro-optical switching approaches have results that include, e.g., compact footprint, low driving voltages, low-loss) but do not provide all requirements simultaneously. For instance, under a CMOS driving voltage of 1 V, electro-optic materials currently yield $\Delta n < 10^{-2}$, requiring device lengths of >100 µm to achieve full switching. Resonant approaches reduce the footprint by leveraging the high finesse of micrometer-sized cavities. Yet, the frequency tunability of lowest-loss resonators is ≤50 GHz/V, which limits the optical bandwidth of switches. Moreover, power hungry stabilization is required since similar resonance frequency shifts occur for single Kelvin temperature fluctuations.

Opto-electro-mechanical (OEM) switches provide an alternative way to control the flow of light by mechanically changing the waveguide geometry rather than modulating the material's intrinsic refractive index. In this approach, waveguide motions lead to local Δn on the order of unity. Because of the strong Δn, small actuations suffice to induce large effective refractive index changes ($\Delta n_{eff}$). Importantly, OEM switches consume negligible amounts of energy in stand-by, as the mechanical geometry is controlled by electrostatic forces that are not accompanied by static currents. Photonic OEM devices implemented to date are switched by actuating hundreds of nanometer scale gap between two silicon waveguides with a remote electro-mechanical driver. The photonic approach yields low optical losses (<0.1 dB), while the large gap size requires high driving voltages (>10 V). In contrast, the sub-wavelength confinement of light in all-plasmonic devices enables stronger OEM responses, which reduce the drive voltages. All-plasmonic switches utilize two metals to form tens of nanometer wide gaps, where light is confined and its phase is modulated by changing the width of the gap via electro-mechanical actuation. However, such confinement comes at the expense of metal induced optical loss (i.e. Ohmic loss ~1 dB/µm), which have to date limited the realization of large-scale plasmonic switching networks.

A hybrid-photonic-plasmonic OEM switch provides a strong plasmonic OEM-effect to fully switch light with a CMOS-level voltage (≈1.4 V) and a compact footprint (≈10 µm²). Simultaneously, the OEM switch uses photonics to lower the propagation losses (0.026 dB/µm±0.002 dB/µm) by two orders of magnitude compared to all-plasmonic approaches. A strong OEM-effect (≈0.03 $\Delta n_{eff}$/V) is achieved by using the plasmonic confinement of light such that a nanometer mechanical movement of an ultra-thin metal membrane provides already full switching control of light. CMOS voltages suffice to induce such small actuations because the nanometer-scale structures offer strong electrostatic forces. Further, our design enables nanosecond-scale switching as the plasmonic skin-depth and strong OEM effects enable low-mass cantilevers with fast response times. Furthermore, the low propagation losses allowed us to exploit resonant nano-opto-electro-mechanical (NOEM) switching with intrinsic nano-quality factors exceeding 3000 to enhance the efficiency such that on-off switching with 200 mV becomes feasible. The resonator's OEM tunability ≈1.25 THz/V permits switching of broadband optical passbands (>300 GHz) overcoming the typical narrowband limitations of other low-loss (≤0.1 dB) resonant switches.

Figure 7:
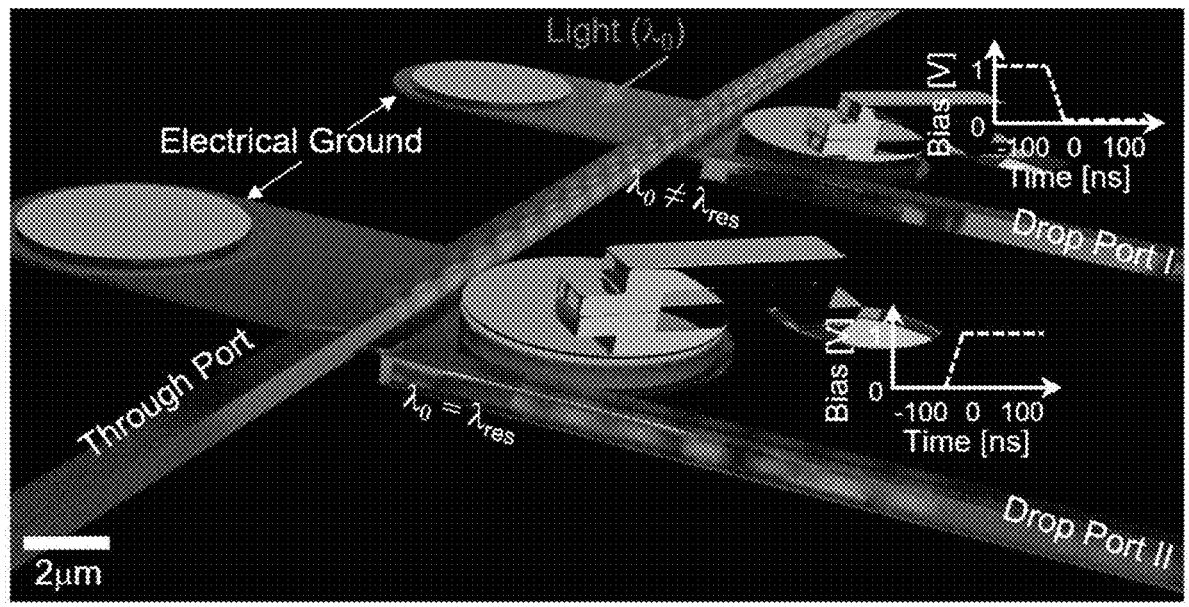
FIG. 7 shows operating mechanism of plasmonic NOEM whereas wherein incident light guided in the through port is switched to a drop port if its wavelength ($\lambda_0$) matches the node's resonance wavelength ($\lambda_{res}$), whereas off-resonance ($\lambda_{res} \ne \lambda_0$) light continues along the waveguide and bypasses the plasmonic resonator, thereby avoiding ohmic losses, according to the Example.

FIG. 7 shows two resonant plasmonic NOEM switches that dynamically route light. The incident light of wavelength $\lambda_0$ is guided in the through port. The light path is determined by the individual resonance wavelength ($\lambda_{res}$) of the switches. In the drop-state light, excites a traveling wave resonance and is transferred to the adjacent drop port if it meets the resonance condition ($\lambda_0 = \lambda_{res}$). In the through-state ($\lambda_0 \neq \lambda_{res}$), light continues along the waveguide and bypasses the plasmonic resonator, thereby avoiding Ohmic losses. The hybrid-photonic-plasmonic (HPP) resonator includes a thin (t≈40 nm) gold foil partially suspended above a silicon disc forming an air gap ($z_0$). The air HPP waveguide combines low-loss propagation in the silicon waveguide with strong field enhancement at the metal surface in the gap (FIG. 8A). Additionally, gold and silicon form an air capacitor to actuate $z_0$ via an electrostatic force generated by an applied voltage ($V_{drive}$). The gold membrane bending (dz) induces a resonance shift ($\Delta \lambda_{res}$) by changing the mode index ($\Delta n_{eff}$), see FIG. 8B.

Figure 9:
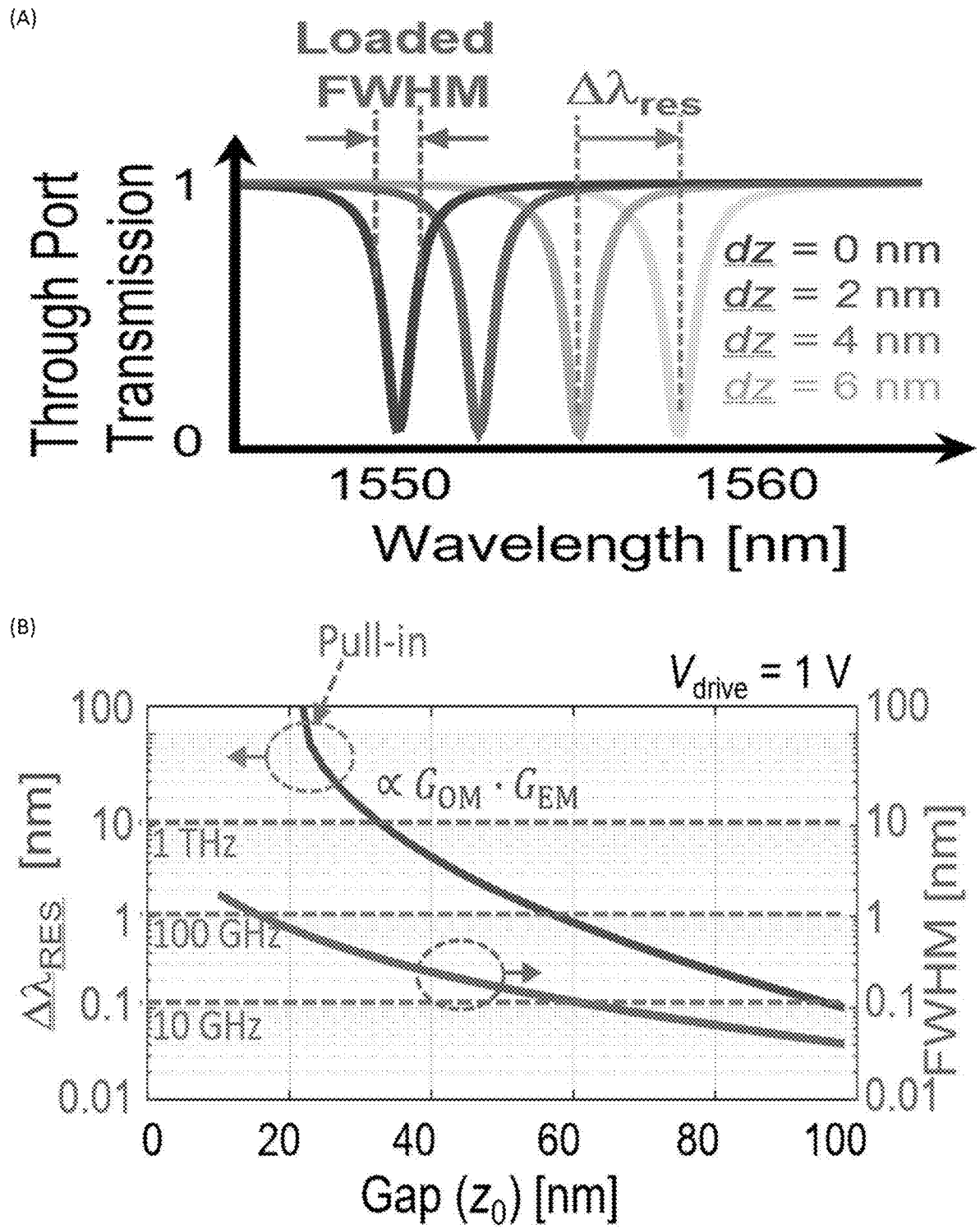
FIG. 9 shows (A) through-port spectra for various dz. (B) Calculations show that $\Delta\lambda_{res}$ increasingly exceeds the intrinsic FWHM when reducing $z_0$, according to the Example.

The large tunability of the resonance wavelength is indicated in FIG. 9A, where δz as small as 4 nm already provide $\Delta \lambda_{res}$ sufficiently larger than the resonance's loaded full-width-half-maximum (FWHM). This enables large extinction ratio (ER) switching between the ports. Furthermore, low-loss coupling to the drop port requires that the plasmonic loss rate in the resonator (intrinsic FWHM) is smaller than drop waveguide-resonator coupling rate. The overall switching efficiency is limited by the ratio between $\Delta \lambda_{res}$ and the intrinsic FWHM, which are shown FIG. 9B as a function of $z_0$. $\Delta \lambda_{res}$ exceeds the FWHM by more than an order of magnitude when reducing $z_0$. This yields a tunability of >1 THz/V (>10 nm/V) for $z_0 \approx 35$ nm, which in combination with the sub-nanometer intrinsic FWHM enables low-loss switching with hundreds of gigahertz optical passbands.

This strong tuning can be understood by separating the OEM effect into its two sub-processes. First, the opto-mechanical coupling ($G_{OM} \propto d\lambda_{res}/dz$) increases for decreasing gaps because of the plasmonic confinement of light to the gap. Thus, more light experiences the strong Δn between air and metals upon actuation. The gold's skin-depth of infrared light is ≈25 nm, thus thin and low-mass metal foils suffice as high reflectors to concentrate light in the gap. Second, the electro-mechanical coupling ($G_{EM} = dz/dV$) reaches large values as the voltage, which is applied over nanometer-scaled gaps, induces strong electrostatic forces ($\propto 1/z_0^2$).

Furthermore, the dynamics of the NOEM switch is determined by its geometrical parameters similar to a ruler that extends beyond the edge of a table. Shorter suspensions (i.e. stiffer spring) and a lighter mass result in faster ruler oscillations ($f_{res}$). In our design we make the overhang as short and thin as possible. The combination of small moving mass, large forces and small mechanical Q-factors enables nanosecond switching at CMOS driving voltages.

Figure 10:
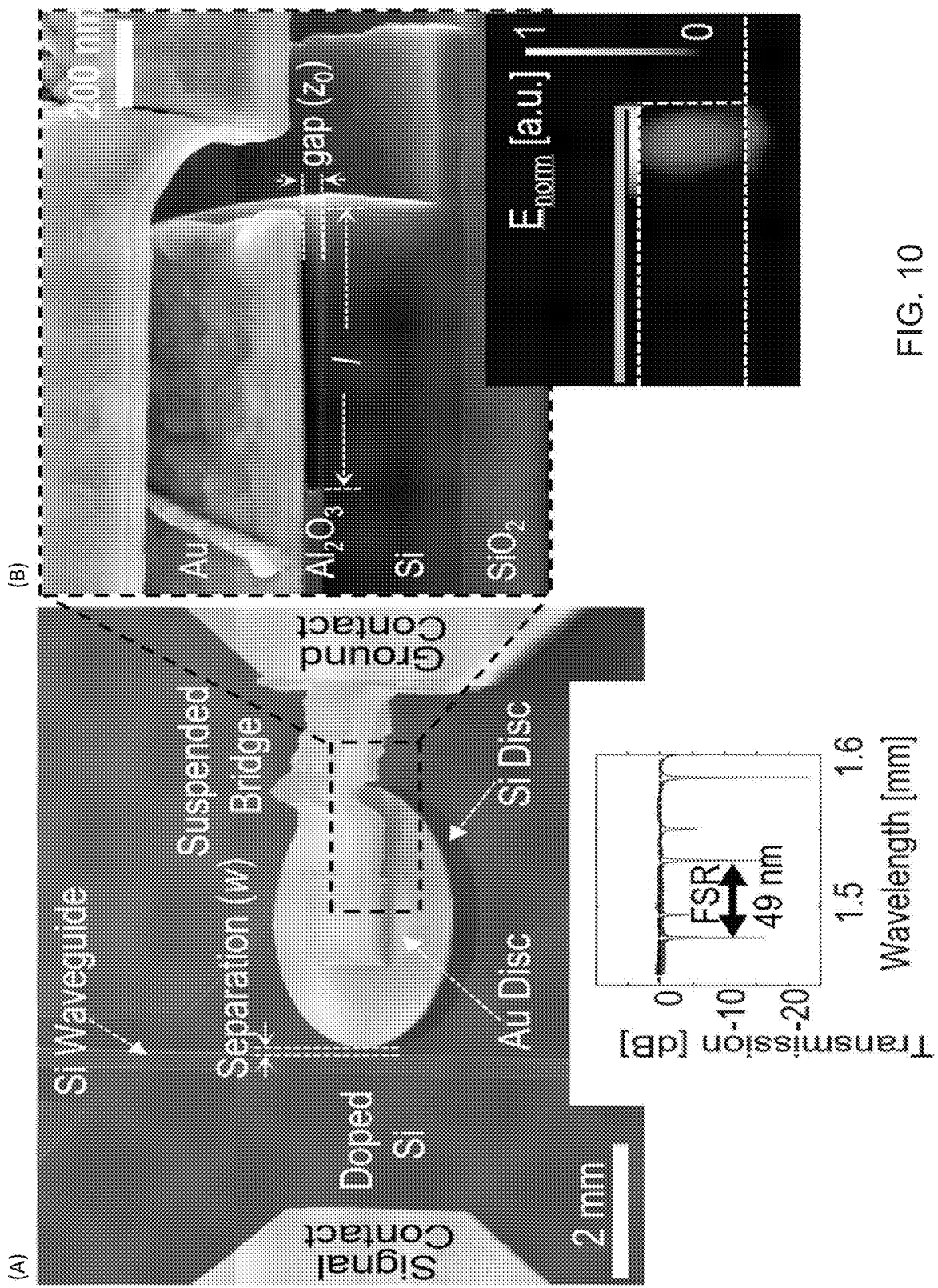
FIG. 10 shows scanning electron microscopy images and measured device properties: (A) perspective view and transmission spectrum. The small cavity volume results in a free spectral range (FSR) of 45 nm. (B) Focused-ion beam cross section. Air gaps ($z_0$) of 35 or 55 nm have been realized. Gap length, 600 nm. The inset shows a simulated optical field, which is strongest in the gap. $E_{norm}$, absolute value of the electric field; a.u., arbitrary units, according to the Example.

FIGS. 10A and B show perspective and cross-section images of fabricated resonators. The drop port was omitted to probe the intrinsic OEM properties of the resonators. Vertical HPP waveguide geometries were uniformly created by depositing and selectively removing a sacrificial alumina layer by wet-etching to a typical undercut value of ≈1.1 µm. Here, atomic layer deposition provides $z_0$ with atomic level precision. The critical feature size is given by the lateral waveguide-disc separation (w) for which our low-loss design enables values >120 nm that are easily achievable with low-cost photolithography.

Figure 11:
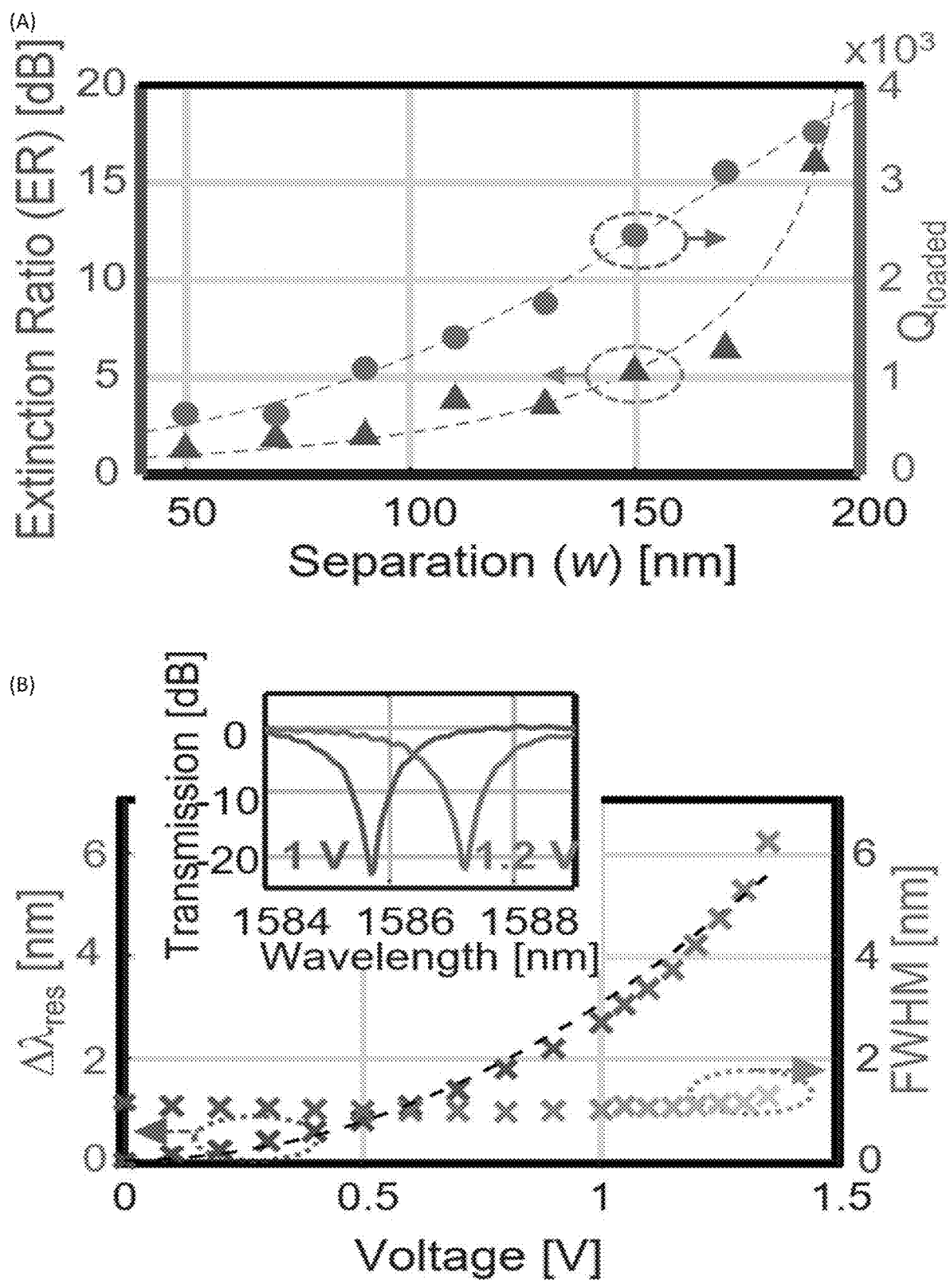
FIG. 11 shows: (A) ER (blue triangles) and loaded Q factor (red circles) versus waveguide-disc separation (w) for $z_0 \approx 55$ nm. The ER peaks at $\approx 200$ nm, indicating critical coupling. (B) $\Delta\lambda_{res}$ (blue to green) and FWHM (red to yellow) as a function of voltage for $z_0 \approx 35$ nm. The inset illustrates complete optical switching with a 200-mV difference. For (A) and (B), the 95% confidence intervals are approximately equal to the symbol size, according to the Example.

To extract the cavity's intrinsic Q-factor ($\propto 1/\text{FWHM}$), we varied w and measured the ER and loaded Q-factor (FIG. 11A). At critical coupling $Q_{intrinsic}$ equals $2 \cdot Q_{loaded} \approx 7000$, which translates to propagation lengths and losses of (395±70) μm and (0.01±0.002) dB/μm, respectively. The reason for such low plasmonic loss is multi-fold. First, Ohmic losses are proportional to the fraction of the optical mode energy penetrating the metal. This fraction drops with decreasing permittivity of the gap dielectric; air or vacuum provide a low dielectric permittivity, minimizing loss. Second, excess losses induced by typical adhesion layers for gold, such as chromium or titanium, are minimized. Overall Ohmic losses are cut approximately in half as air exposure oxidizes the 1 nm titanium adhesion layer used here. Third, the interaction of the HPP mode and gold membrane is mostly restricted to the smooth metal surface facing the gap, reducing scattering losses compared to those of metallic horizontal waveguides.

In order to characterize the switching capability, we measured $\Delta\lambda_{res}$ and the loaded FWHM as a function of DC voltage (FIG. 11B). The total $\Delta\lambda_{res}$ is >6 nm and equals five times the FWHM. The nonlinear red-shift is expected from electro-mechanical effects as the increasing proximity of the metal membrane increases $\Delta n_{eff}$. Furthermore, the quadratic voltage dependence of the electrostatic forces allows one to enhance the voltage sensitivity of the resonance shift ($\Delta\lambda_{res}/V$) to $\approx 10$ nm/V (i.e. $\approx 1.25$ THz/V) by biasing the device with 1 V. In comparison, other resonant switching technologies (i.e. free-carrier-dispersion or Pockels effects) feature $\Delta\lambda_{res}/V$ of 50 GHz/V. Furthermore, the demonstrated tuning capability enables the compensation of thermally induced which are typically hundreds of pm/K. The large $G_{OM}$, $G_{EM}$ and Q-factors allows to reduce the required actuation distance to a few nanometers, and correspondingly the switching time to tens of nanoseconds as shown in the following.

Figure 12:
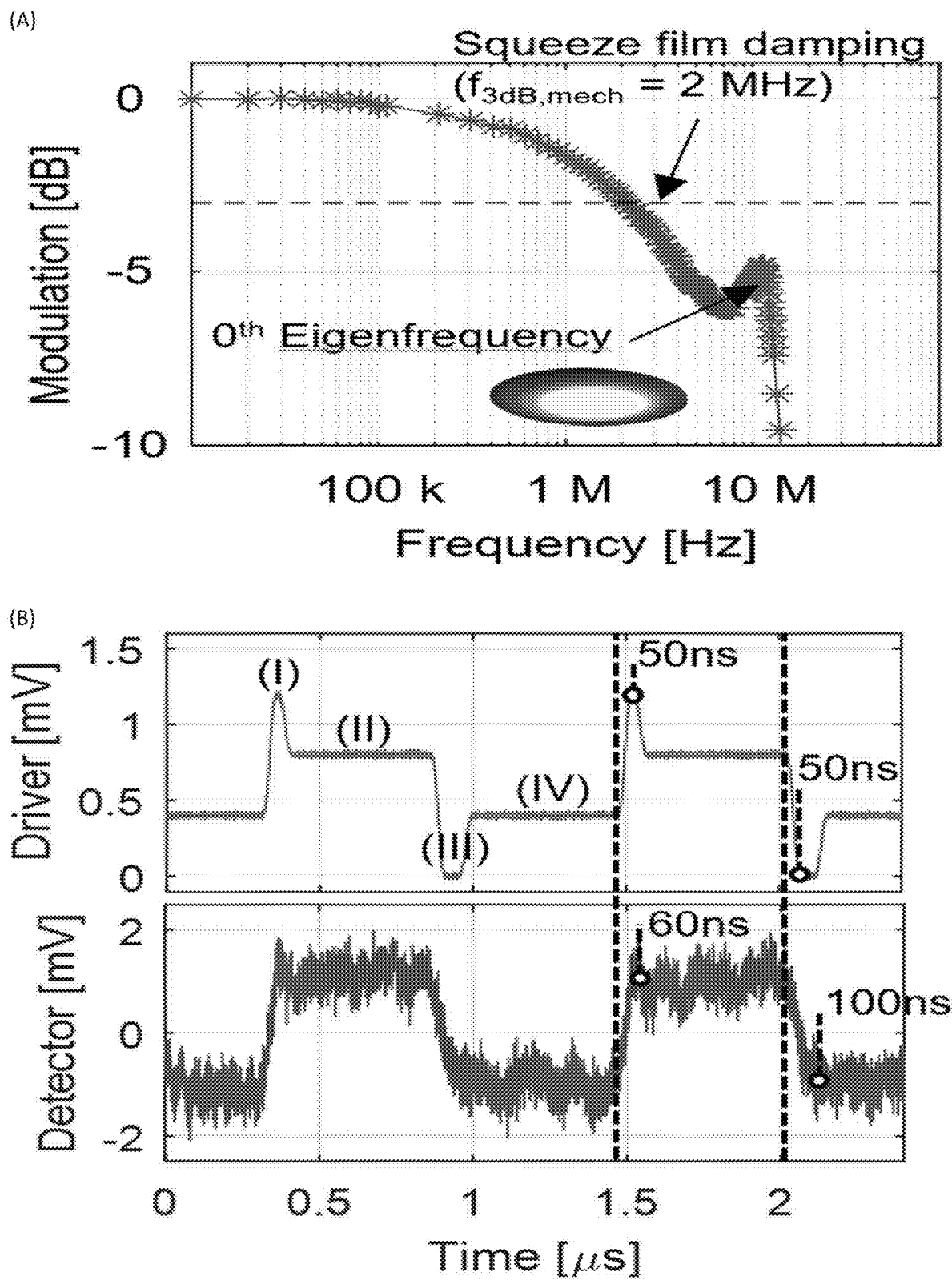
FIG. 12 shows time dynamics: (A) Modulation response for a sinusoidal driving signal. The inset shows the mode shape of the fundamental mechanical eigenfrequency. k, thousand; M, million. (B) Utilizing more complex driving signals (red) enables optical (blue) rise and fall times about tens of nanoseconds. The optical contrast between on and off state exceeds 90%, according to the Example.

FIG. 12A shows the small signal modulation response with a free of $\approx 12$ MHz. The small mechanical Q-factor and the roll-off in modulation at lower frequency is attributed to squeeze-film damping and stiffening; e.g. air compression increases the stiffness when increasing the frequencies and thus lowers the actuation. The effect becomes more dominant for smaller gaps. This low-pass characteristics can be overcome by vacuum packaging or advanced driving signals. FIG. 12B shows a twostep driving scheme, the applied drive voltage (I) and (III) exceeded the steady-state voltage (II) and (IV) at the start of the individual on and off switching pulses. This resulted in rise and fall times of 60 ns and 100 ns, respectively, where the difference is due to electrostatic actuation forces that are larger than the spring restoring forces. The devices have been switched with megahertz frequencies over hours (billions of switching cycles) without showing a degradation of the signal quality. We estimate an electrical power consumption of $\approx 600$ nW and 130 aJ when switched at tens of megahertz and a peak to peak voltage of 1.4 V and 0.2 V, respectively. Further optimization promises that NOEMS can reach fall and rise times approaching the few nanosecond level, while maintaining CMOS driving voltages.

Figure 13:
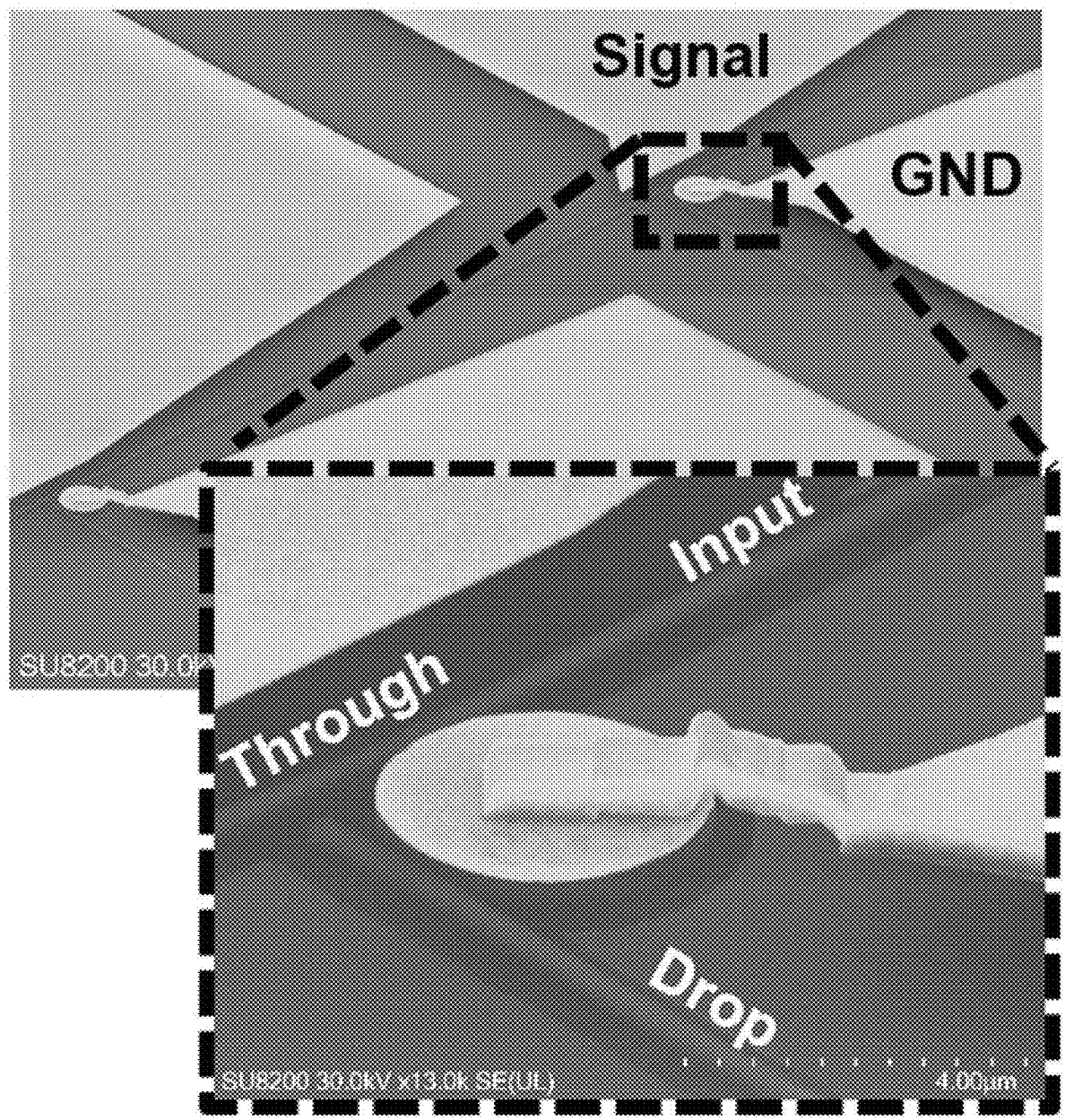
FIG. 13 shows perspective scanning electron microscopy image of two fabricated NOEMS. GND, electrical ground, according to the Example.

Subsequently, we performed 1×2 switching experiments. FIG. 13 shows an SEM image of the fabricated devices. The through and drop port transmission spectra are plotted in FIG. 14A. Coupling the resonator to the drop port broadens the FWHM (optical bandwidth) from $\approx 1$ nm (125 GHz) to $\approx 2.5$ nm (350 GHz), yielding optical broad-bandwidth operation. Still, $\Delta\lambda_{res}$ ($\approx 6.2$ nm) exceeds multiple FWHM.

Figure 14:
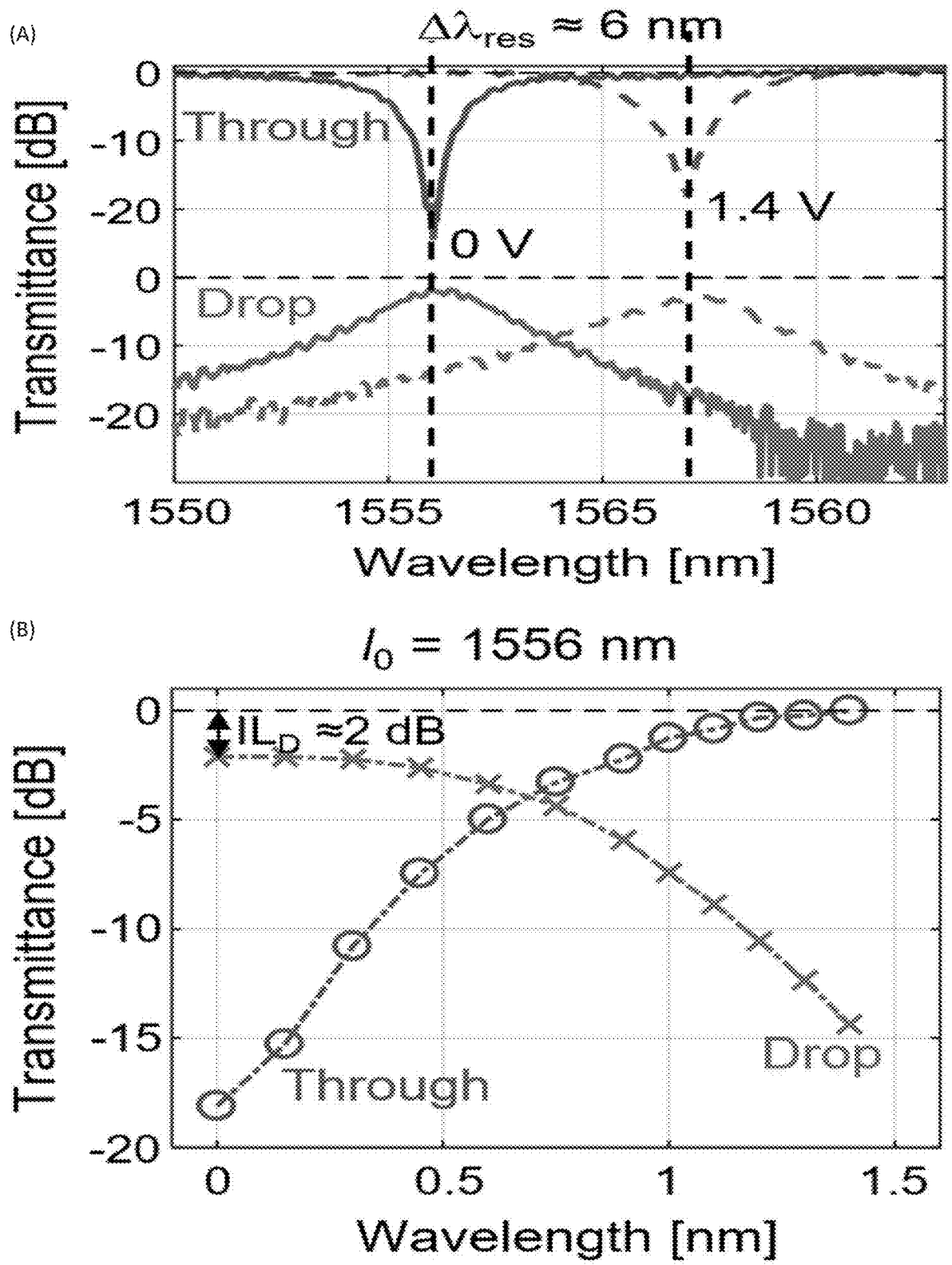
FIG. 14 shows: (A) Measured power spectrum of light coupled to the through port (blue) and the drop port (red) under 0 V (solid) and 1.4 V (dashed) bias. (B) Through-port (blue circles) and drop-port (red crosses) transmittance over voltage, according to the Example.
Figure 15:
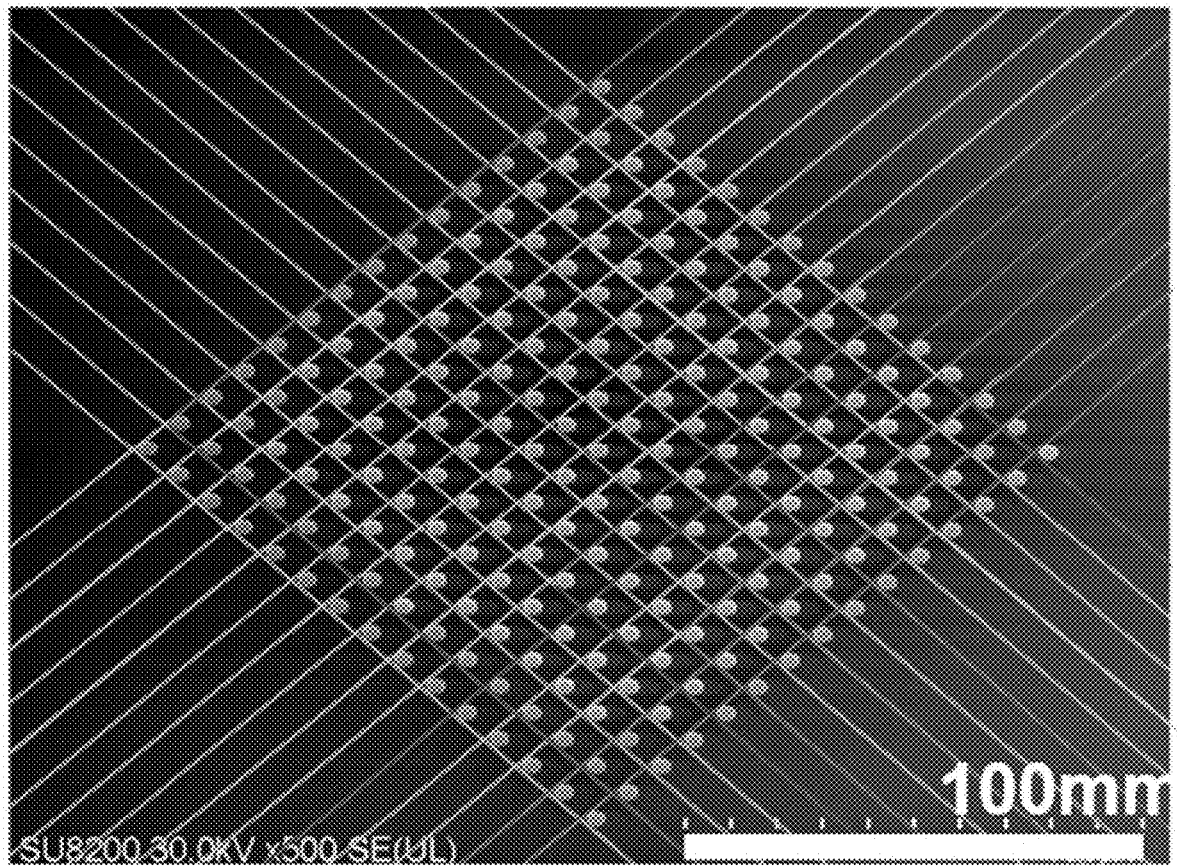
FIG. 15 shows low through-port losses are beneficial for switching architectures such as cross-grid networks envisioned here, where light (various rainbow colors) only needs to be switched once to a drop port while propagating through a 15-by-15 network. The 95% confidence interval is smaller than the symbol size. $\lambda_0$, probing wavelength, according to the Example.

FIG. 14B shows the transmittance versus voltage. Here, 0 V and 1.4 V correspond to routing light to the drop and through ports, respectively. In both cases, cross-talk was below −15 dB and drop port losses ($IL_D$) were $\approx 2$ dB, while through port losses ($IL_T$) were $\approx 0.1$ dB. Numerical optimization may further reduce $IL_T$ to $\approx 0.02$ dB and $IL_D$ to $\approx 1.5$ dB. This loss asymmetry is ideal for future applications in N×N cross-switching grids. Because light experiences $IL_D$ only once, accumulated losses (i.e. path of the red light beam) are dominated by through port loss (i.e. overall loss $\leq 2N \cdot IL_T + IL_D$) when propagating through the network. This would result in an average loss-to-port count ratio of 0.12 dB per port for an optimized 15×15 network.

The optoelectromechanical switch overcomes conventional presumptions that opto-electro-mechanics is a slow and bulky technology that requires high driving voltages. NOEM switches have compactness for high-density optical switch fabrics that are directly co-integrated with CMOS driving circuits. For instance, 200 switches and their electrical drivers could be integrated on an area as small as the cross-section of a single human hair. Beyond that, the strong OEM interaction and low-loss could enable non-resonant functional units such as phase-shifters and intensity-modulators for, e.g., LiDAR applications. The performance of phase shifters is typically evaluated by the voltage-length product $V_\pi L$, which states the minimal combination of $\pi$ phase shift voltage times device length. The HPP prototypes demonstrated here already feature a $V_\pi L = (27 \pm 4)$ Vμm, which in combination with low propagation losses ($\alpha = 0.026$ dB/μm±0.006 dB/μm), represents a substantial improvement over the conventional devices. The scaling law governing OEM switches predict that a further reduction of the gap size to 10 nm will enable $V_\pi L < 1$ Vμm. The stronger effect permits reduction of the device length to reduce the overall device losses by a factor up to ten. These switches could form the building blocks of optical field-programmable gate arrays (OPGA) and trigger a technological revolution similar to the one enabled over the past few decades by electrical field-programmable gate arrays (FPGA).

Figure 16:
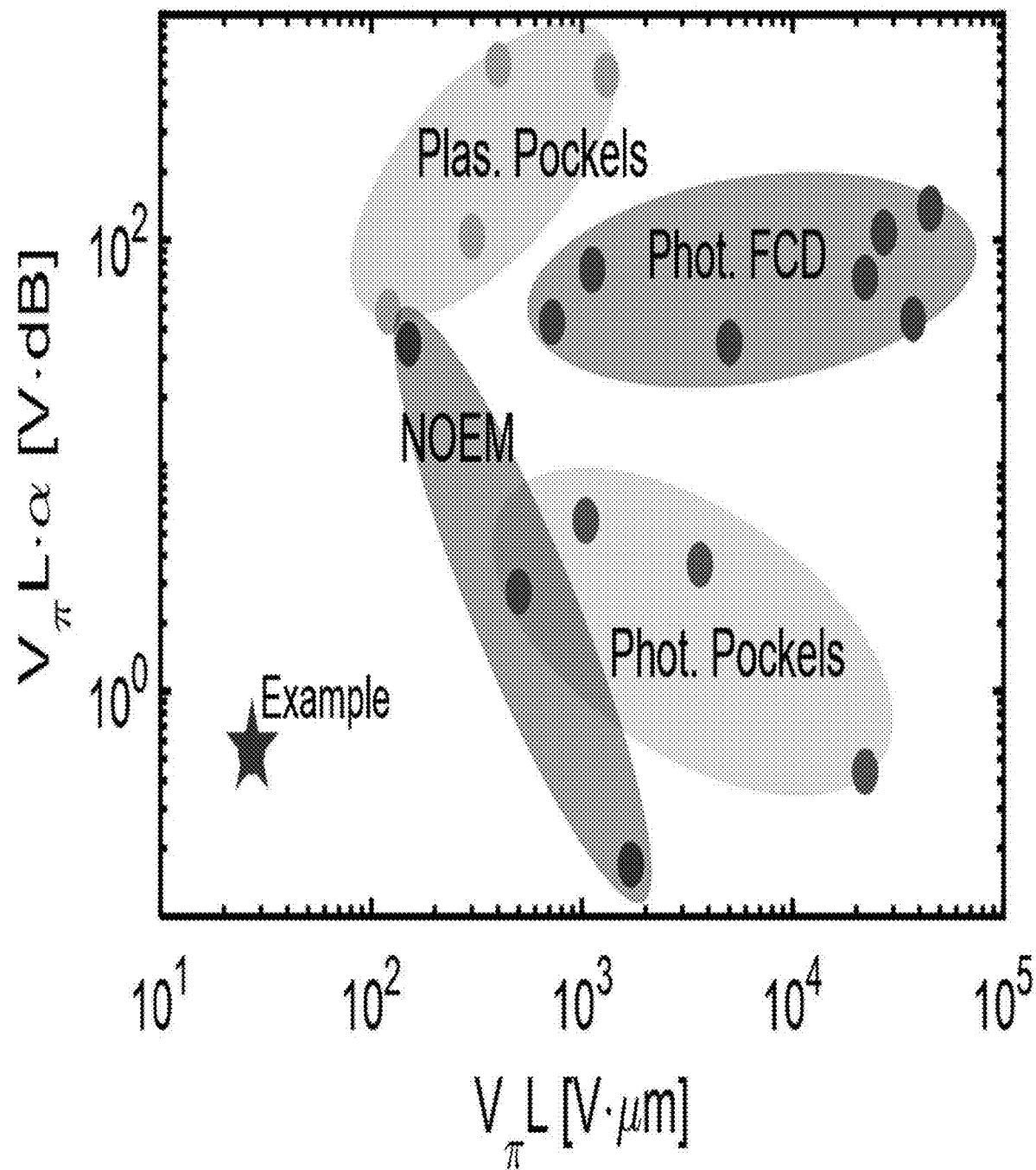
FIG. 16 shows a $V_\pi L\alpha$ and $V_\pi L$ for various phase shifter technologies (free-carrier-dispersion-effect in photonics (blue), Pockels effect in photonics (red), Pockels effect in plasmonics (yellow) and nano-opto-electro-mechanical effects (purple). The $V_\pi L\alpha 0$ indicates the driving voltage to achieve a $\pi$ phase shift and the associated propagation loss in dB. The $V_\pi L$ is a figure of merit for device compactness when minimizing the operating voltages. The device in this work combines the best both of these figures of merit, enabling new fields of applications. Please note, this comparison focuses solely on phase-shifting technologies as they enable low-loss devices, according to the Example.

The NOEMS is compared to conventional electro-optic technologies, which should feature low optical loss and low driving voltages, while maintaining the most compact footprint possible to reduce cost. In order to compare various technologies, we visualize these figures of merit with the help of the voltage-length-loss product ($V_\pi L \cdot \alpha$ [VdB]) and the voltage-length-product ($V_\pi L$ [Vμm]). The former quantifies the trade-off between optical loss (in decibel) and driving voltage (in volts) while the latter indicates the trade-off between device footprint (micrometer) and driving voltage (in volts). The ideal technology should feature the lowest values for both. FIG. 16 shows experimental values (dots) obtained from the following phase shifting technologies: free carrier dispersion photonic devices (blue), Pockels effect photonic devices (red), Pockels effect plasmonic devices (yellow) and nano-opto-electro-mechanical photonic/plasmonic devices (purple).

As expected, photonic Pockels technologies perform well in terms of $V_\pi L \alpha$ due the low inherent losses, but require long devices as is reflected in the large $V_\pi L$ values. In contrast, plasmonic Pockels devices—with their strong electric field confinement—improve electro-optic efficiency to allow for smaller footprints (small $V_\pi L$) but at the expense of high propagation losses (larger $\alpha V_\pi L$). NOEM-based implementations follow this tradeoff. The hybrid-photonic-plasmonic technology in this work pushes the frontiers of the NOEM technology to the lower-left corner of the plot, enabling the first compact and low-loss electro-optic technology that is capable of being operated with CMOS driving voltages. Optimizing this technology promises further improvements. For instance, reducing the gap to 20 nm will reduce $V_\pi L$ by more than an order of magnitude approaching $V_\pi L$ of voltananometer-level, while simultaneously lowering $V_\pi L\alpha$ by a factor of two or more.

Excluded is opto-electro-thermal devices because their stand-by power consumption is typically milliwatt per switch and a dense integration might suffer from thermal crosstalk. Contrarily, the ideal power consumption of NOEMS is negligible and only nanowatt power is consumed even when switching at highest rate.

To compare non-resonant and resonant technologies with each other, we extracted the $V_\pi L$ and the propagation loss ($\alpha$) by utilizing a resonator's sensitivity ($\Delta\lambda/V$), circumference ($L=2\pi R_{eff}$), group refractive index ($n_g$), free spectral range (FSR) and intrinsic Q-factor. The $V_\pi L$ was calculated via $$V_\pi L = \frac{FSR}{2 \cdot \frac{\Delta\lambda}{V}} \cdot 2\pi R_{eff} \text{ with } V_\pi = \frac{\pi}{\Delta\varphi/V} = \frac{FSR}{2 \cdot \frac{\Delta\lambda}{V}}, \quad (1)$$

where $\Delta\varphi/V$ is the per Volt induced phase shift after one circumference.

The propagation loss per length is $$\alpha = \frac{10 \cdot \log_{10}\left(\frac{P}{P_0}\right)}{L} \text{ with } P = P_0 \cdot \exp(-2k''L) = \exp\left(-\frac{2\pi \cdot n_g}{Q \cdot \lambda_0} \cdot L\right). \quad (2)$$

where k" is the mode's imaginary part of the wave vector. Furthermore, ½k" equals the propagation length of a mode. Please note, that the equation (2) is obtained by utilizing the following relations: $\exp(-\delta t_{rt})=\exp(-2k''L)$, where $\delta=\omega_{res}/Q$ is the power decay rate of the cavity and $t_{rt}$ is the roundtrip tip time.

Uncertainties of measurements influenced the extracted parameters such as $V_\pi L$ and $\alpha$. For our devices, we measured an FSR of 49 nm with an uncertainty of ±0.3 nm. This uncertainty is defined by the laser's digital step resolution during the wavelength sweeps. A further uncertainty is given by the average circumference that light covers during one roundtrip in the HPP resonator. The HPP mode is mostly confined to the inner (≈1.5 μm) and outer (≈2 μm) radius. This provides an upper and lower bounds for the circumference estimation ($2\pi R_{effective}\approx 2\pi\cdot 1.75$ μm±2π·0.25 μm). We determine $V\pi L=(27\pm 4)$ μm when biased with 1 V, where the upper and lower bounds are determined by the upper and lower bounds of the circumference and FSR.

The uncertainties in estimating the propagation losses are governed by the uncertainties of the quality factor and group refractive index $$n_g = \frac{\lambda_0^2}{FSR \cdot L} = 4.5 \pm 0.7. \quad (3)$$

Again, we use the upper and lower bounds of the FSR and the circumference L determined in the previous paragraph to determine the upper and lower bounds of the group refractive index. The loaded Q-factor of the device presented in FIG. 11B is 1560±160, with the 95% confidence interval statistical uncertainty determined from the fit to the data. Based on these uncertainties we estimate propagation losses of (0.026±0.006) dB/μm and propagation lengths (178±40) μm. Following the same analysis for the device presented in FIG. 2C, we obtain propagation losses of (0.01±0.002) dB/μm and propagation lengths (395±70) μm.

The sensitivity of propagating light to waveguide deformations (e.g. reduction of the gap size $z_0$) can be quantified by the change in the effective refractive index ($\delta n_{eff}$) or the opto-mechanical coupling rate ($G_{OM}$)

$$G_{OM} = 2\pi \frac{df_{res}}{dz_0} = -2\pi \cdot \frac{d\lambda_{res}}{dz_0} \cdot \frac{c_0}{\lambda_{res}^2}, \quad (4)$$

where $c_0$ is the speed of light in vacuum. $f_{res}$ and $\lambda_{res}$ are the resonance frequency and wavelength, respectively. $G_{OM}$ is related to $dn_{eff}$ by $$G_{OM} = -2\pi \cdot \frac{dn_{eff}}{dz_0} \cdot \frac{f_{res}}{n_{eff}} \quad (5)$$

Figure 17:
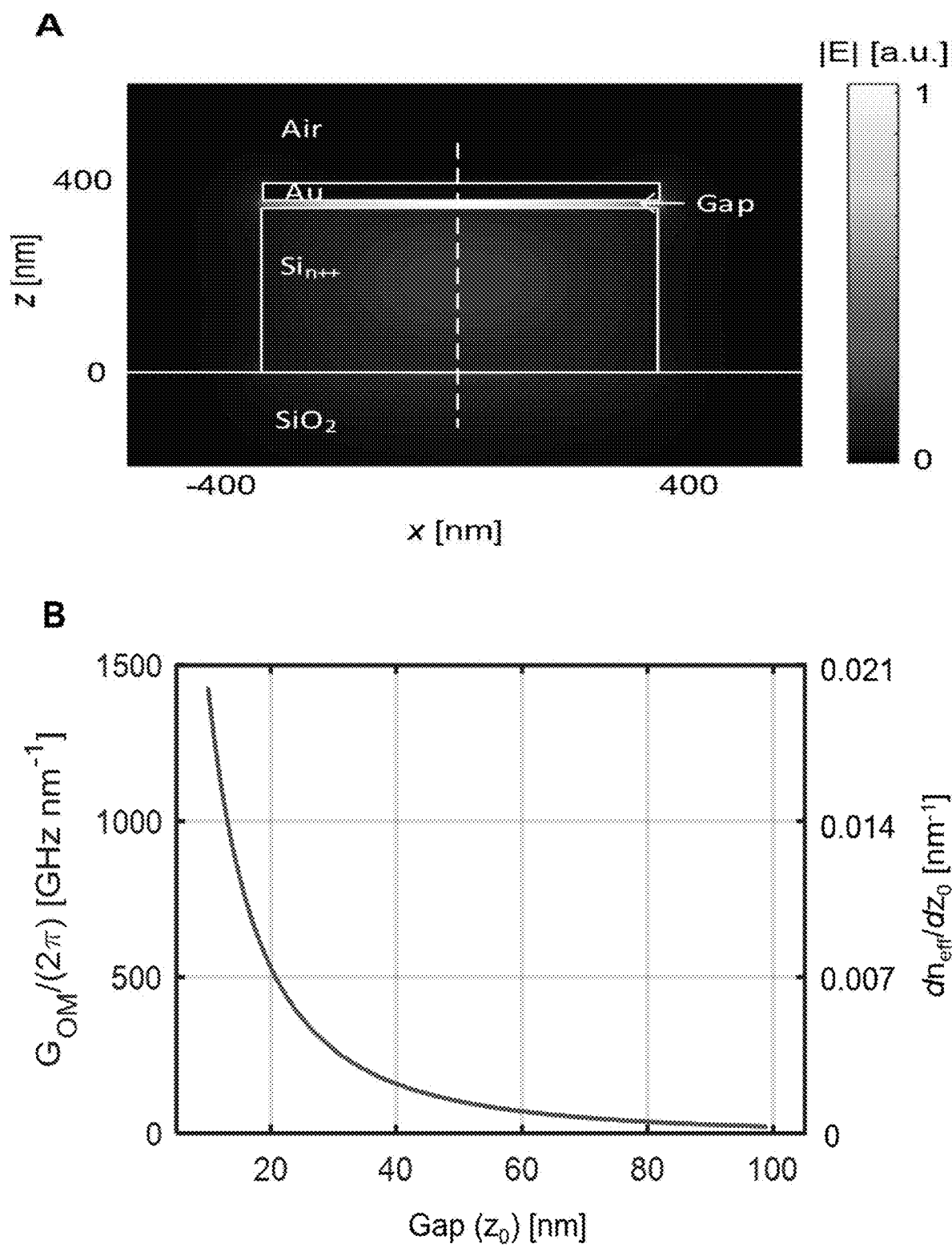
FIG. 17 shows opto-mechanical coupling ($G_{OM}$) as a function of the the gap height. (A) Optical mode of an hybrid plasmonic photonic waveguide. (B) Coupling rates up to THz/nm can be achieved for the smallest gaps. Moderate gaps of 20 nm to 50 nm result in $G_{OM}$ of hundreds of gigahertz while benefiting from Q-factors of several thousands, according to the Example.

FIG. 17 shows both $G_{OM}/2\pi$ and $dn_{eff}/dz_0$ as a function of the gap distance ($z_0$) for a hybrid-photonic-plasmonic (HPP) waveguide. The results are obtained by means of FEM simulations. We approximated the bended disc resonator by a straight rectangular waveguide for reason of simplicity as bending losses are negligible for discs with radius of 2 μm (21) and the utilized actuation is negligible to the suspension length of ≈1.1 μm.

The HPP waveguide's optomechanical coupling benefits from a strong plasmonic enhancement with reduced gap size and can reach values of up to 1400 GHz/nm and 250 GHz/nm for gap height of 10 nm and 30 nm, respectively. In the following, we use the perturbation theory to discuss the origin of the strong coupling.

$$G_{OM} \propto \frac{\int dz_0(x,y) \cdot \left((\varepsilon_{r,air} - \varepsilon_{r,obj})|E_p|^2 - \left(\frac{1}{\varepsilon_{r,Air}} - \frac{1}{\varepsilon_{r,obj}}\right)|D_n|^2\right)dA}{\int (U_{electric} + U_{magnetic})dV}, \quad (6)$$

where $U_{electric}$ and $U_{magnetic}$ are the electrical and magnetic energy of the optical mode. The integral in the numerator defines the change in the energy of the optical mode (resonance shift) induced by an actuation ($dz_0(x, y)$) of the object's surface (dA). The integral comprises two terms to account for the discontinuity of the boundary condition. The first accounts for the energy change experienced by the electrical field parallel ($E_p$) to the object/air interface, while the second accounts for the perturbation of the displacement field normal to the interface ($D_n$). The following three conclusions can be drawn. First, for materials with negative permittivity, a larger $G_{OM}$ requires that fields are strongly polarized ($E_p \gg E_n$ or $E_p \ll E_n$), since the contributions of the parallel and perpendicular field components have opposite signs. This is the case for plasmonic waveguides at infrared wavelengths. Second, the coupling increases with the field strength at the interface. The field strength is increased in our device because the suspended gold membrane acts as a near perfect electrical mirror that confines energy to the air gap. Third, a large difference in the relative permittivity of the object and air is desired to maximize the change in energy.

Our device achieves an optimum balance between low loss and high $G_{OM}$. For comparison, lossy ($Q_{intrinsic} \approx 100$) metal-insulator-metal (MIM) waveguide geometries report $G_{OM}$ values of $2\pi \cdot 2000$ GHz/nm for gaps of 15 nm. Meanwhile, low-loss ($Q_{intrinsic} > 10000$) silicon photonic crystal waveguides report values of $2\pi \cdot 36$ GHz/nm for gaps of 30 nm. These two demonstration are at the extreme of the loss versus opto-mechanical coupling spectra. Resonant switching networks require a $$\frac{1}{Q_{loaded}} = \frac{1}{Q_{coupling,d}} + \frac{1}{Q_{coupling,t}} + \frac{1}{Q_{intrinsic}} < 750, \quad (7)$$

to provide nanometer optical bandwidth. At the same time the drop port coupling rate should be higher than the intrinsic loss rate, to achieve acceptably low drop port loss (i.e. $Q_{coupling,d} > Q_{intrinsic}$). Furthermore, minimizing the crosstalk between through and drop port requires that the critical coupling condition is fulfilled $$\frac{1}{Q_{coupling,t}} = \frac{1}{Q_{coupling,d}} + \frac{1}{Q_{intrinsic}}. \quad (8)$$

Figure 18:
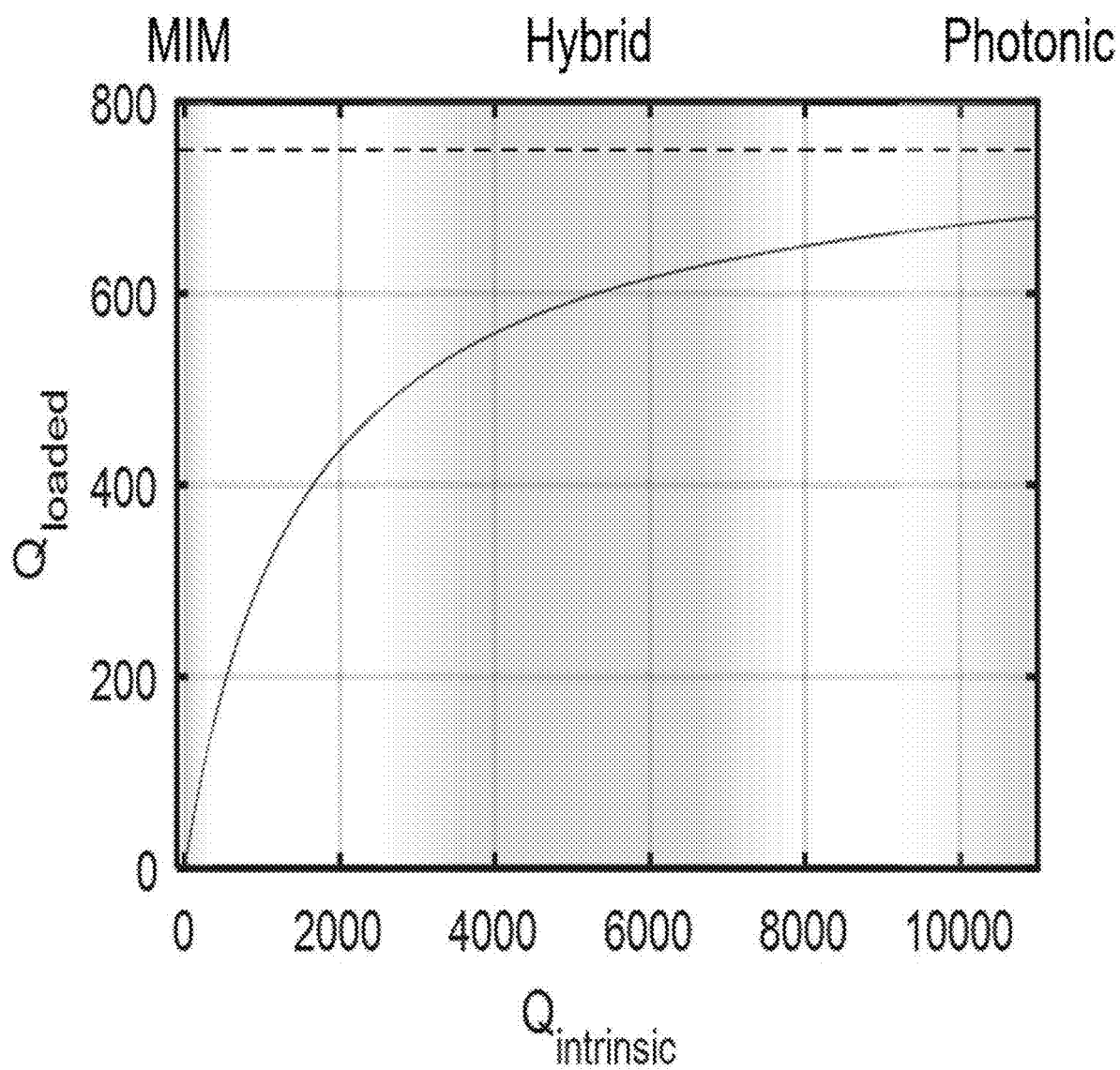
FIG. 18 shows loaded quality factor as a function of the intrinsic Q-factor under critical coupling. The devices presented were designed for an optical bandwidth of 2 nm, which is indicated here by the black dashed line. The green area highlights the typical Q-factors achievable for different waveguide geometries and $Q_{coupling,d}=1500$, according to the Example.

FIG. 18 shows the evolution of the loaded Q-factor as a function of the intrinsic Q-factor. Small intrinsic Quality factor have a strong influence while its influence strongly diminishes for $Q_{intrinsic} > Q_{coupling}$, see FIG. 18. Thus, the hybrid-photonic-plasmonic waveguide geometry provides a good trade-off between opto-mechanical coupling and Q-factors to enable broadband and low-loss optical switching networks.

Applications for the optoelectromechanical switch 200 includes as a quantum opto-electro-mechanical converters in numerous devices and process. These can require a single-photon-coupling-rate ($g_0$) that is larger than the square root of the product between optical ($\gamma_{O,loaded}$) and mechanical ($\gamma_M$) decay rates. $g_0$ is given by $$\frac{g_0}{2\pi} = \frac{G_{OM}}{2\pi} \cdot z_{zpf} = \frac{G_{OM}}{2\pi} \cdot \sqrt{\frac{\hbar}{2m_{eff}\omega_{mech}}} \approx 4 \text{ MHz} \quad (9)$$

The zero-point fluctuation ($z_{zpf}$) of our approach is $\approx 20$ fm based on an effective mass of $\approx 1.8$ pg and a mechanical frequency of $\approx 12$ MHz. The optical decay rate at critical coupling is $\gamma_0 < 200$ GHz for an loaded Q-factor larger than 1000. The mechanical decay rate was increased by squeeze film damping to a few megahertz. However, operation under vacuum and further optimization could lead to $\gamma_M \sim 10$ kHz (i.e. mechanical Q-factors of 1000). Thus, the ratio between the square of the single-photon coupling rate and decay rates reaches values close to unity. Future improvements can be expected as Ohmic loss of metals are reduced at cryogenic temperature. Alternatively, silver could be used to replace gold to lower the optical loss further. Normally, silver is avoided because it oxidizes in ambient atmosphere, however, we expect the devices to be vacuum sealed.

The sensitivity of the mechanical actuation with respect to an applied voltage ($dz_0/dV$) is quantified by the electro-mechanical coupling ($G_{EM}$). In the following, we highlight laws that govern the actuation as a function of the voltage and geometrical/material properties. For a more detailed discussion, we refer the reader to.

The NOEM switches were operated with deformations $dz_0 < 10$ nm being a fraction of the overall gap $z_0$. Thus, for reason of simplicity, we approximate a constant electrostatic force density along the suspended gold foil. Stronger actuation results in a position dependent force increase, which normally results in larger displacement. The load is $$F_{EM} = \frac{dU}{dz_0} = \frac{1}{2}V_{drive}^2 \cdot \frac{dC(z_0)}{dz_0}, \quad (10)$$

where, U is the electrical energy stored in the capacitor. $V_{drive}$ is the applied voltage. C is the device capacitance, which is approximated by an air-filled parallel plate capacitance having a suspended surface area $A = \pi(R^2 - (R-1)^2)$. Therefore $$F_{EM} \approx \frac{1}{2}V_{drive}^2 \cdot \frac{\varepsilon_0 \cdot A}{z_0^2}. \quad (11)$$

The electrostatic actuation (typically: $F_{EM} \sim 10$ nN for our geometry) induces a small deformation and is counterbalanced by an elastic restoring force, that can be model by a spring system for small actuations $$F_{restoring} = -k_{spring} \cdot dz_0. \quad (12)$$

where $k_{spring}$ is the effective spring constant of the suspends gold membrane. Please note, the restoring force is linearly proportional to the displacement as long as the induced stress is smaller than the yield point of the material (amorphous gold: $\approx 0.2$ GPa; crystalline gold: $\approx 0.8$ GPa). This is the case under small actuation. The electrostatic (equation (11)) and restoring (equation (12)) force are equal in steady-state, thus yielding $$dz_0 = \frac{A}{k_{spring}} \cdot \frac{1}{2}V_{drive}^2 \cdot \frac{\varepsilon_0}{z_0^2}. \quad (13)$$

Thus we can estimate an upper limit of the spring constant $$k_{spring} < \frac{A}{dz_0} \cdot \frac{1}{2}V_{drive}^2 \cdot \frac{\varepsilon_0}{z_0^2} \approx (15.4 \pm 7.3) \text{ N/m}. \quad (14)$$

Here we utilized the $d\Delta\lambda_{res}$, measured at $V_{drive} = 0.4$ V, to transform it into a $dz_0 \approx (0.4 \pm 0.1)$ nm with the help of the calculated $G_{OM} \approx (220 \pm 40)$ GHz/nm. Please note, that the uncertainties of the lower and upper values are given by the minimal and maximal measured gap heights during the characterizations of multiple devices ($z_0 = (35 \pm 5)$ nm). As a comparison, the analytic expression for a point loaded cantilever yields $$k_{spring} = E\frac{wt^3}{4l^3} \approx 10.5 \text{ N/m}, \quad (15)$$

where w is the average circumference of the suspended gold membrane. E is the Young's modulus, which is $\approx 70$ GPa for amorphous gold. The analytic expression (15) underestimates the effective spring constant compared to equation (14), as the load is applied at the tip of the cantilever, which induces a larger displacement compared to an equally distributed load.

In summary, we can draw the following conclusions for the small actuation limit ($dz_0 < z_0$) from equation (3).

For a constant drive voltage, the displacement is proportional to the inverse of the squared gap height. This provides a scaling path and by reducing $z_0$ to tens of nanometers sufficient actuation can be achieved despite small CMOS level driving voltage. Furthermore, reducing the gap height not only increase $G_{EM}$ but also $G_{OM}$.

The quadratic voltage dependency allows amplification of small signal voltage by using a bias as $F_{EM}(t) \propto (V_{AC}(t) + V_{DC})^2$ and $F_{EM,AC}(t) \propto (2V_{DC}V_{AC}(t))$. For instance, using a bias of $V_{DC}=1$ V effectively enhances a $V_{AC}=200$ mV by ten-fold. This enhancement enable on- and off-resonance switching with only $V_{AC}=200$ mV, as shown in FIG. 11B.

Figure 19:
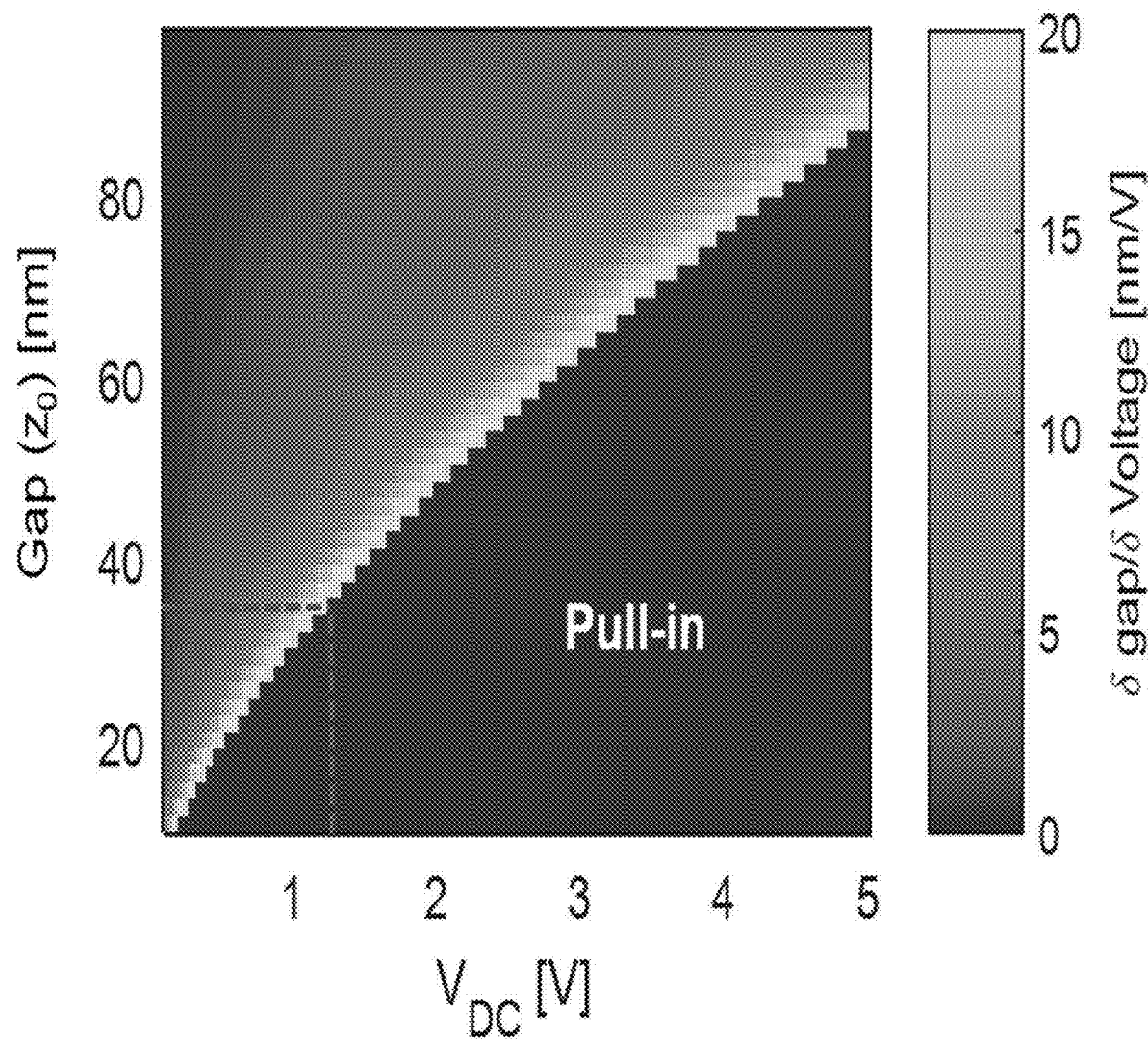
FIG. 19 shows electro-mechanical coupling rate ($G_{EM}$) as a function of applied bias and initial gap height $z_0$. $G_{EM}$ for a beam length of 1.1 µm. $G_{EM}$ reaches values beyond 20 nm/V. The dark blue areas at the bottom right indicate the voltages for which an irreversible pull-in of the beam is expected. Please note, during our experiments, we observed pull-in voltages >1.5 V for gaps of 35 nm, according to the Example.

FIG. 19 shows the analytically calculated electro-mechanical coupling ($G_{EM}$) as a function of a bias voltage ($V_{DC}$) and initial gap height ($z_0$) for a beam length of 1.1 µm. The values are obtained for a small AC-signal actuation around the bias ($V_{AC}=2\% \; V_{DC}$).

The dark blue area in FIG. 19 indicates the parameter space for which a destructive and not reversible pull-in event of the gold membrane is expected. The pull-in event occurs when the quadratic dependency on the gap height of $F_{EM}$ out-scales the linear dependency of $F_{restoring}$, meaning that $dF_{EM}/dz > dF_{restoring}/dz$. Biasing the device close to the pull-in is not desired despite the increased sensitivity because:

Voltage spikes during operation can cause the irreversible pull-in event. The system's effective spring is softened and reaches zero when the bias approaches the pull-in voltage. This ultimately reduces the switching frequencies to zero.

Figure 20:
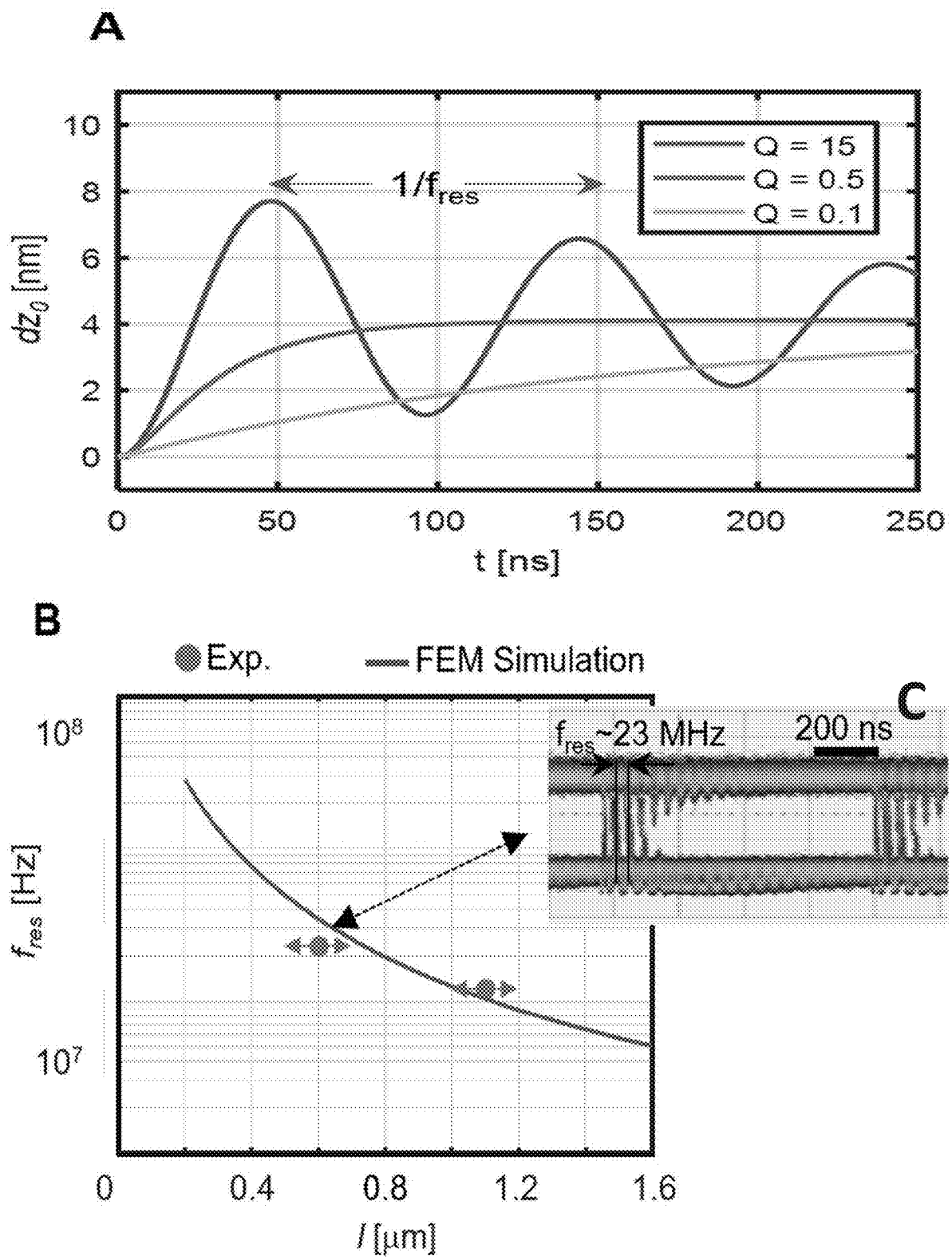
FIG. 20 shows dynamic properties. (A) Actuation over time for various mechanical Quality factors. Q above 0.5 corresponds to underdamped systems while values below indicate an overdamped system. Critical damping is observed for Q=0.5. The response was obtained for a rectangular 1 V driving signal using Newton's law of motion for a 1100 nm beam that is underdamped (blue), critically damped (red) and overdamped (yellow). (B) FEM simulations of $f_{res}$ of a gold membrane with various suspension lengths (C) Measured eye-diagram. The ring tone of 23 MHz indicates that the system is underdamped. Parameters: Rectangular driving voltage of $V_{DC}=4.75$ V and $V_{AC}=0.5$ V. for a $z_0=(55\pm5)$ nm, according to the Example.

The achievable switching speed ($\propto 1/f_{res}$) is determined by the mechanical damping ($\propto 1/Q$) and mechanical eigenfrequency of the suspended gold membrane. The latter one can be roughly approximated by $$f_{res} \approx \frac{1}{2\pi} \sqrt{\frac{k_{spring}}{m_{eff}}}, \tag{16}$$

where, $m_{eff} \approx 1.8$ pg is the effectively oscillating mass of the gold membrane and can be approximated by $m_{eff} \approx 1/4 \cdot A \cdot t \cdot \rho_{metal}$. FIG. 20A shows the dynamic responses (actuation vs. time) to a 1 V driving signal applied at t=0 ns for various damping coefficient under vacuum. The fastest response is observed for the underdamped case (blue), however, the mechanical ringing results in a settling time that is hundreds of nanoseconds long. The ringing can be avoided by using advanced driving schemes to increase the acceleration and deceleration, enabling a rise time of 10 ns.

Contrarily, the switching speed is reduced if the system is subject to damping and such systems behave like low-pass filters (yellow; or red) and increasing the switching speed requires a driving signal that compensates the low-pass characteristics by enhancing the energy of the signal's high frequencies components. Such an approach is shown in FIG. 12B.

In addition the resonance frequency can be increased by increasing the stiffness ($k \propto 1/l^3$) of the spring or by reducing the springs mass ($m_{eff} \propto l \cdot t \cdot \rho_{Au}$), see equation (16). FIG. 20B shows $f_{res}$ as a function of the suspension length l for a gold thickness of 40 nm based on accurate FEM simulations. Shorter suspension result in larger eigenfrequency and the numerically calculated values (blue line) are $\propto 1/l^2$. Experimental values are highlighted by the green dots. For a (600±100) nm under etch, we observed a eigenfrequency of ≈23 MHz, which is clearly visible in the measured optical eye-diagram of a 1.2 Mb/s pseudo-random-bit-sequence. The visibility of the ring tone indicates that this device is underdamped (Q≈10). This is in contrast to the strong damping (Q≈1) observed for the devices having a $z_0$ of 35 nm and a suspension length of (1100±100) nm. The difference in damping is due to squeeze film damping that is more pronounced in the device with larger undercut and smaller gaps. Furthermore, the modulation response in FIG. 12A drops prior to approaching the resonance frequency. We attribute this to the elastic force contribution of the squeezed air, which in such small gaps can be on the same order as the mechanical restoring force. This may explain a large decrease in the dynamic response, due to both the increased stiffness as well as the strongly modified mode shape. For instance, the modal motion at the edge of the gold membrane will decrease more than at the points closer to the clamp.

Furthermore, optimization requires that both the eigenfrequency and the driving voltage are considered as both for instance scale with the spring constant. Thus we need to optimize $$\frac{f_{res}}{V_{drive}} \propto \sqrt{\frac{\varepsilon_0}{\rho_{metal} \cdot t \cdot z_0^2 \cdot dz_0}}. \tag{17}$$

We increased this ratio significantly by combining narrow gaps with a thin gold membrane and a low loss resonant approach. Here, narrower gaps enable larger electrostatic driving forces while keeping the voltage low. Thinner membranes reduce the mass resulting in faster $f_{res}$. A higher finesse allows one to reduce the actuation needed to induce enough phase shift ($\Delta\varphi \propto G_{OM} \cdot dz_0$). Non-resonant structures require a phase shift of $\pi$ to completely switch light, while resonant structures reduces the required phase shift by $\propto 1/Finesse$. Our low-loss resonator provides a finesse of ≈21 for a 1×2 switch and ≈49 for a 1×1 switch which is a strong improvement over all-plasmonic approaches featuring finesse of 1 to 3.

Furthermore, improvement of $f_{res}/V_{drive}$ drive by a factor of 4 can be achieved by using silver ($\rho_{Ag} \approx 0.5 \cdot \rho_{Au}$) and reducing the thickness to 20 nm and the gap to 20 nm. The lower Ohmic loss in silver compared to gold compensates for the increased losses due to the tighter mode confinement when reducing the gap. This results in a resonance frequency of 40 MHz.

The device was operated for billions of switching cycles and no deformation was observed. This indicates that the induced stress at the anchor point of the beam did not exceed the yield point of the material. The n-doped chip is highly doped, and thus, we do not expect any RC-bandwidth limitations prior to the mechanical eigenfrequency.

Figure 21:
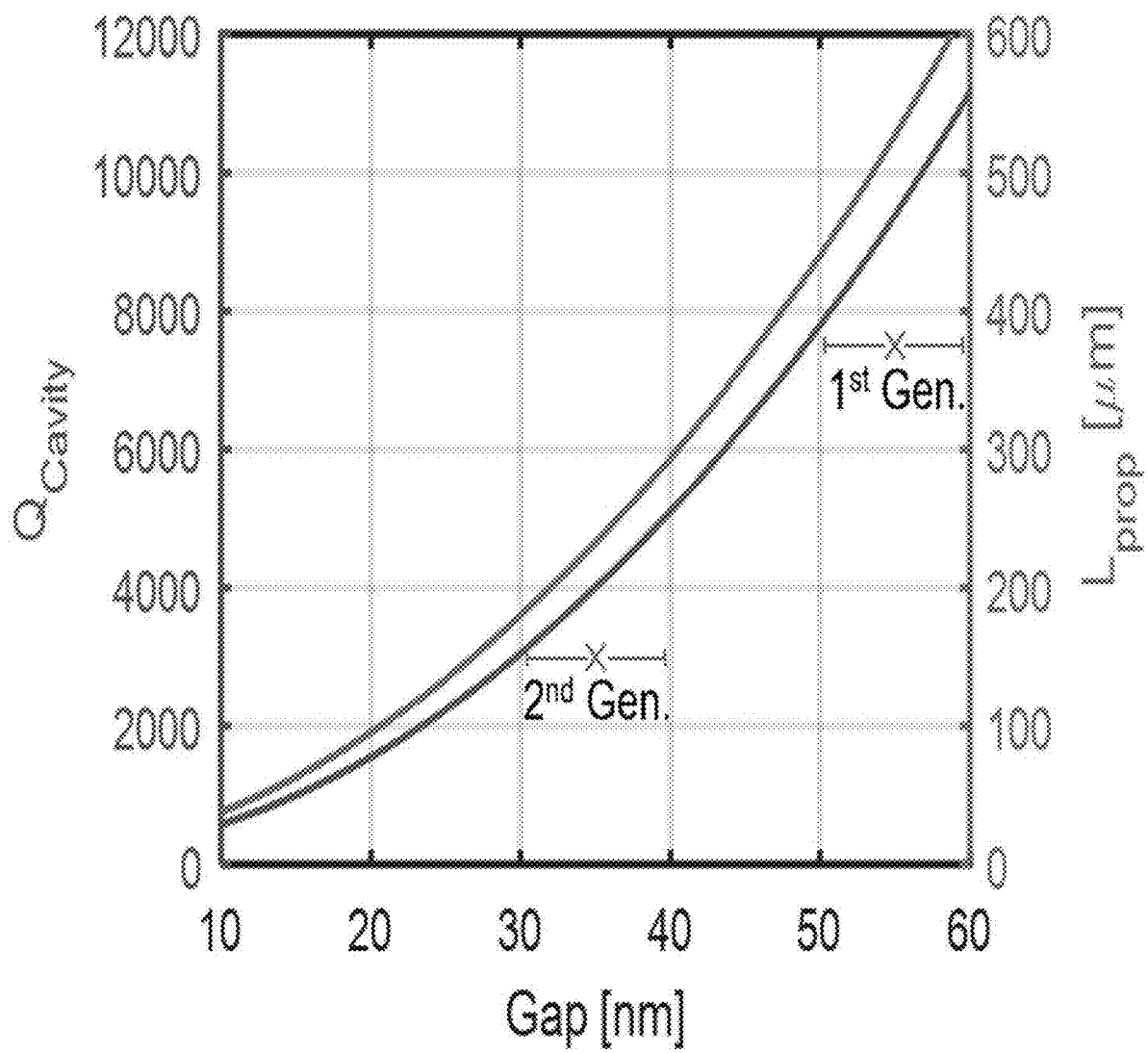
FIG. 21 shows calculated Quality factor (blue) and propagation length (red) of an ideal HPP waveguide geometory. The blue crosses highlight the measured Quality factors based on our experiments and confirm that this structures is capable of achieving large Q-factors. Arrows highlight the maximal measured variations in the gap height, according to the Example.

The presented hybrid-photonic-plasmonic resonator reaches opto-mechanical coupling $>2\pi \cdot 300$ GHz/nm while featuring Q-factors of several thousand as shown in FIG. 21. The measured Q-factors of the devices are highlighted by the blue crosses. Please note, we measured gap variations up to ±5 nm in the gap height as indicated by the arrows with the help of atomic force microscopy. Q-factors of a few thousands can be achieved despite plasmonic gaps of only tens of nanometers. This corresponds to propagation length ($L_{prop}$) of a few hundreds of microns. Please note, that cavity losses are dominated by Ohmic propagation loss because the high confinement of light minimizes the bending losses.

Figure 22:
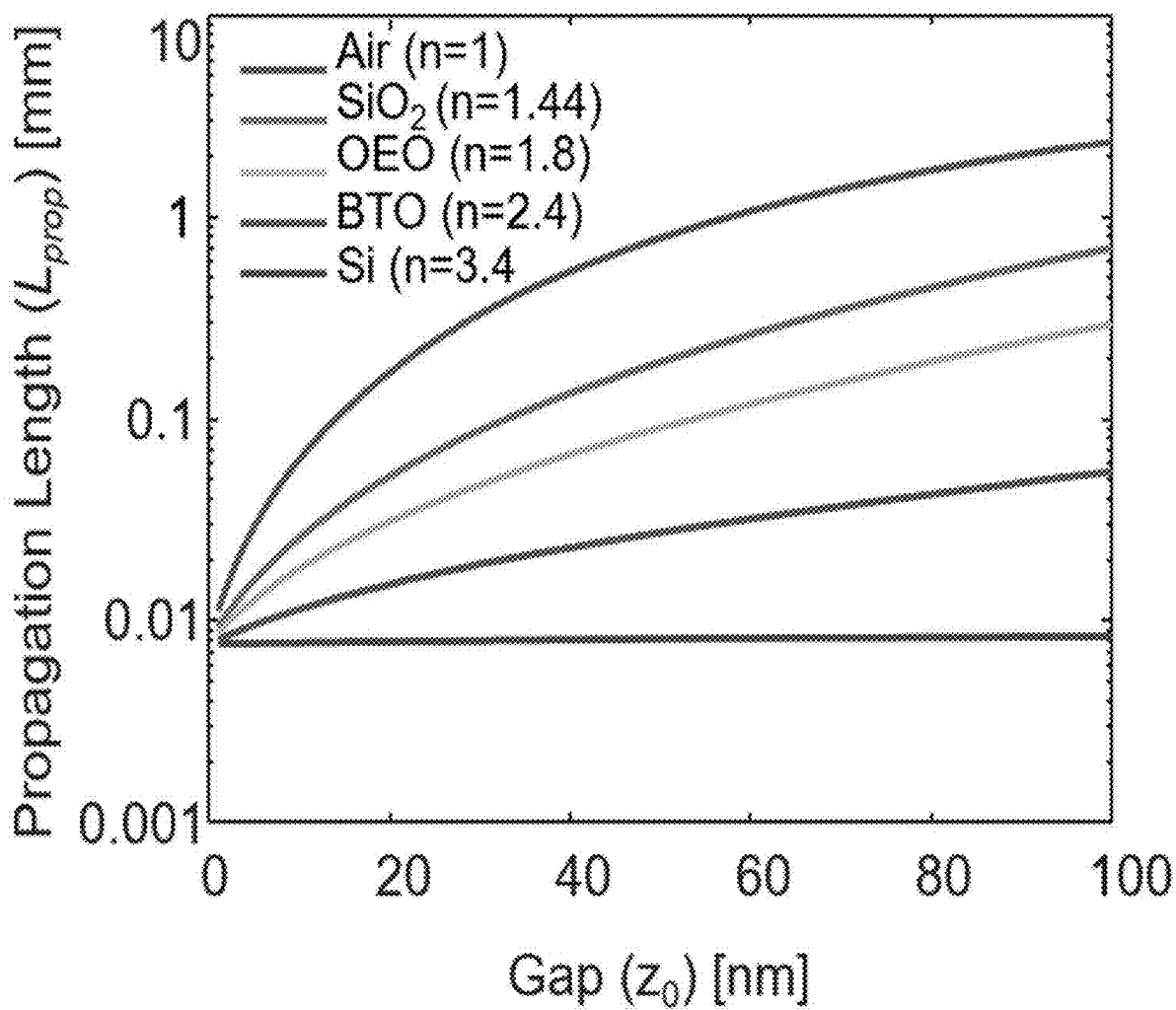
FIG. 22 shows modeled Propagation length of various hybrid-photonic-plasmonic waveguides. The gaps are filled with the stated materials and lowest losses are observed for air gaps. Here, OEO stands for organic-electro-optic molecules and BTO for barium titanate, according to the Example.

The achieved propagation lengths of hundreds of micrometers are better than for conventional plasmonic electro-optic devices. This can be understood by the low permittivity of the air gap, lowering the fraction of mode energy inside the metal. FIG. 22 shows the dependency of the propagation length for various gap filling materials. Air HPP waveguides feature an order of magnitude lower loss than organic-electro-optic chromophores (OEO) HPP waveguides. This providing an advantage for our OEM HPP technology over competing plasmonic technologies to realize large-scale low-loss switching networks.

Designing a switching network (e.g. N×N cross-grid networks) involves trade-offs between drop port losses, through port losses and signal bandwidth. The maximal insertion loss of a cross-grid networks is given by $<2N \cdot IL_T + IL_D$. Small networks require balanced through port and drop port losses, while larger networks benefit from lower through port loss.

Figure 23:
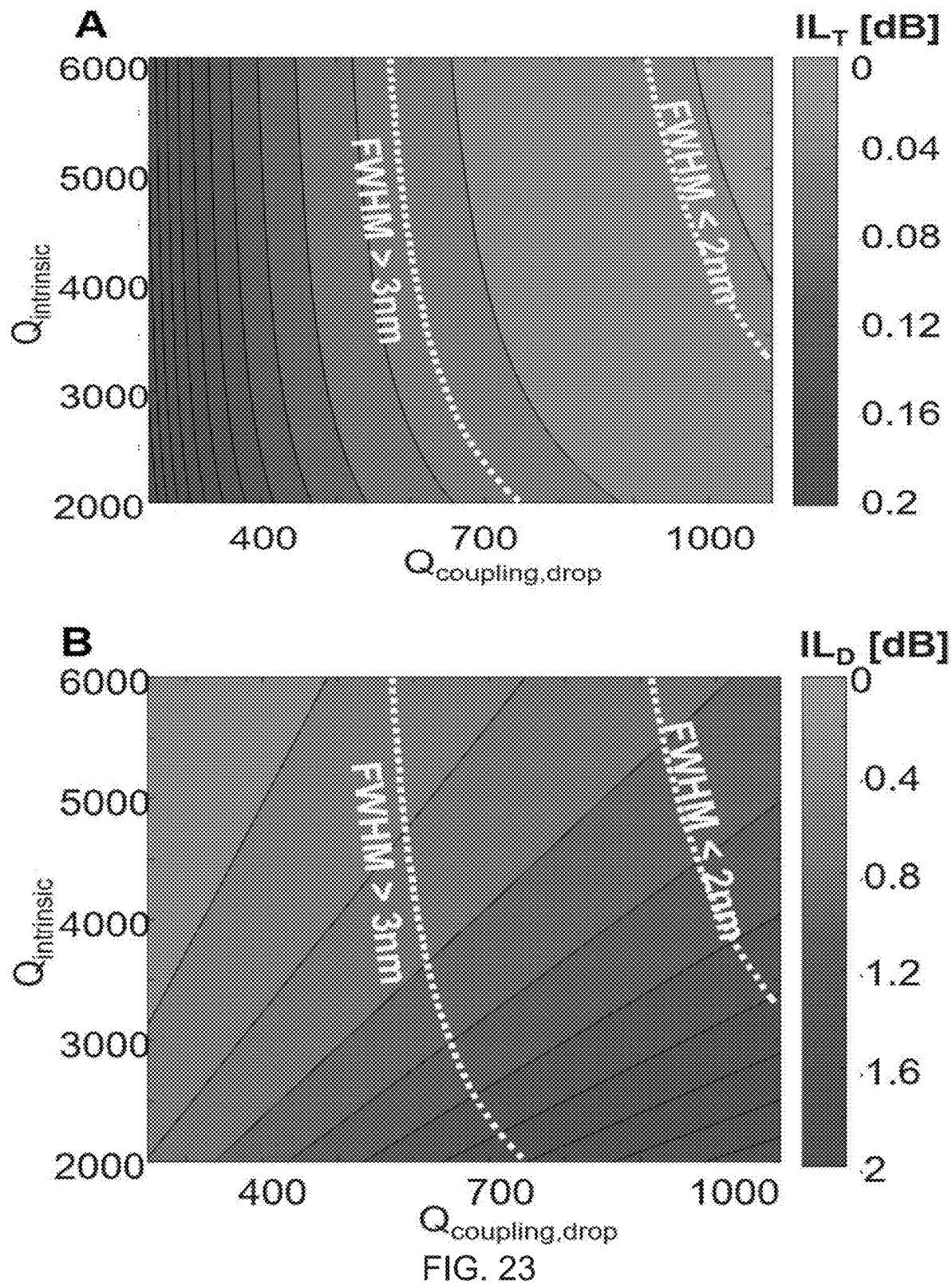
FIG. 23 shows insertion loss (IL) of light routed to the through port (A) and drop port (B). The white dashed lines indicate the achievable FWHMs and values larger than 2 nm are desired for 100 GHz signals, according to the Example.

FIG. 23 shows the calculated insertion loss for the through port (A) and drop port (B) as a function of $Q_{intrinsic}$ and $Q_{coupling,drop}$ (coupling loss to drop port). The calculations are based on an analytic model assuming critical coupling and negligible loss in the waveguide-cavity coupling section. The white dashed lines highlight the achievable FWHMs of 1×2 switch. Broadband optical responses of >2 nm are desired for broadband optical switching and thermal stability. Increasing the coupling between the drop port and cavity (i.e. reducing $Q_{coupling,drop2}$) increases the through port loss ($IL_T$) as the second drop port acts as a further cavity loss channel. This results in an increase of $IL_T$ from 0.025 dB to 0.2 dB for a $Q_{cavity} \approx 3000$. Contrarily, increasing the coupling rate lowers the drop port loss $IL_D$ from −1.5 dB to −0.5 dB. Furthermore, stronger coupling results in a larger FWHM that requires higher driving voltages to achieve $\Delta\lambda_{res}$>FWHM.

Figure 24:
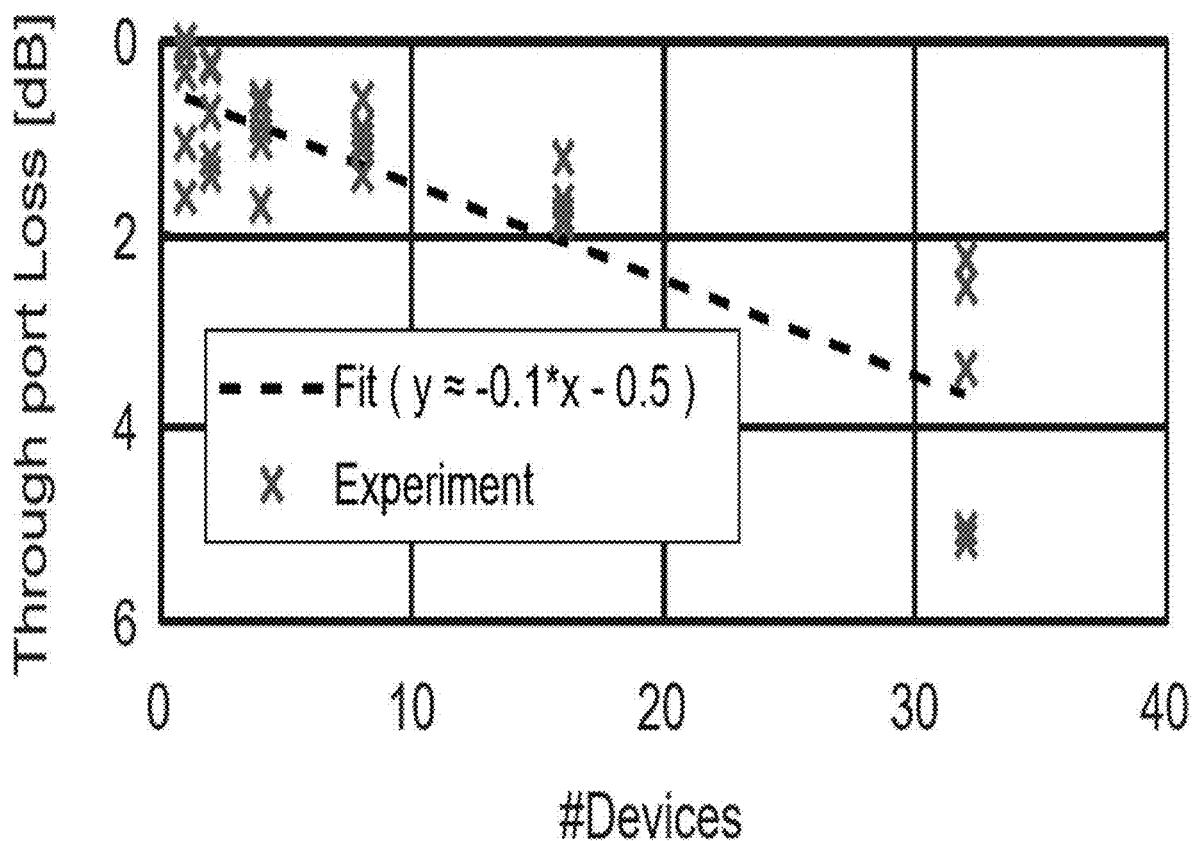
FIG. 24 shows cut-back measurement for determining the through port loss ($IL_T$). The linear fit indicates loss of ≈0.1 dB per resonator. The variance is attributed due to miss alignment and pull-in events during fabrication indicating ample room of improvement for the coming generations, according to the Example.
Figure 26:
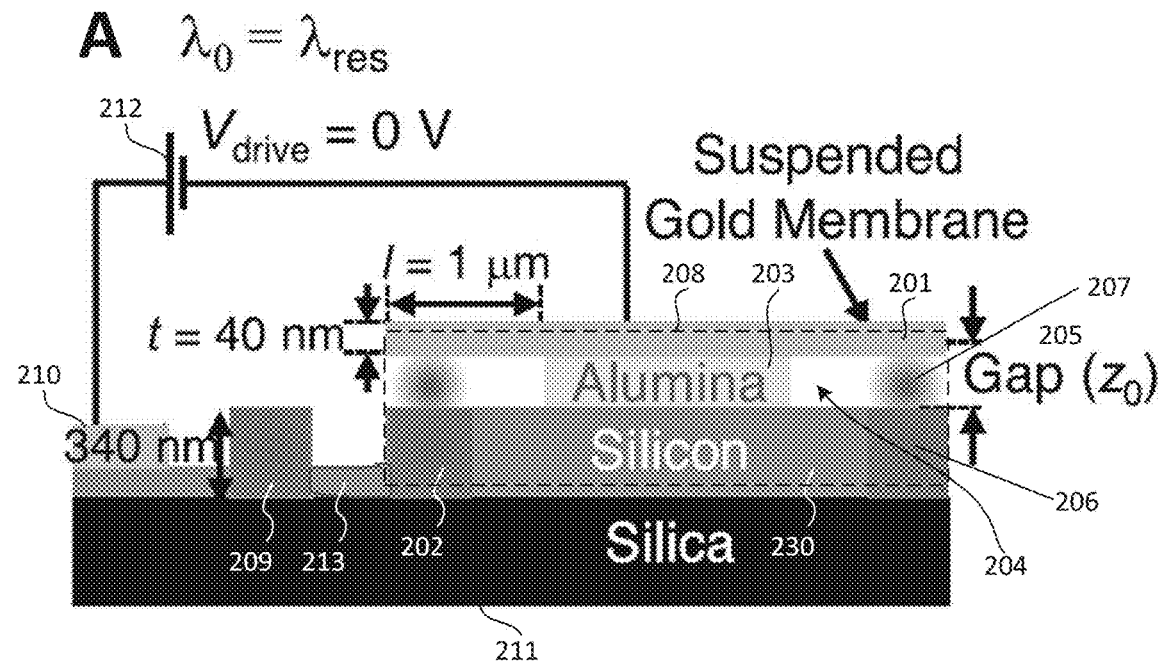
FIG. 26 shows operating mechanism of plasmonic NOEM networks, wherein (A) HPP disc resonators (radius 2 µm) are formed by a thin gold membrane suspended above a silicon disc forming a gap ($z_0$). (B) Doped silicon and gold bridges are used to apply a voltage across the gap, thus inducing an electrostatic force that bends the membrane and prevents light from coupling to the resonator, according to the Example.

$IL_T$ has been determined by measuring the transmission as a function of the number of resonators coupled to the bus waveguide. The results are shown in FIG. 24 in blue, while the black dashed line represents a linear fit. From a linear fit we extract average $IL_T$ of ≈0.1 dB per resonator. We attribute the deviation from the optimal value of 0.025 dB to fabrication imperfections as well as pull-in of individual resonators during the critical-point-drying process.

The power consumption of OEM devices is governed by the energy required to perform a switching operation and the number of operations per second. The measured static current in stand-by was <1 nA (noise floor). This confirms that the static power consumption is negligible for OEM switches as their air capacitor acts as a perfect isolator.

The energy required to switch ($U_{switch}$) is determined by the energy lost in the resistive elements of the circuit when loading the OEM device capacity $$U_{swich} = \tfrac{1}{2} C V_{drive}^2. \quad (18)$$

Large capacitances (C) or driving voltages ($V_{drive}$) increase the charging time and current flow through the device circuit resistance, respectively. The measured device capacitance is ≈6 fF and agrees with theoretical models based on a simple plate capacitor. Thus, we estimate $U_{switch}$ to be ≈6 fJ and ≈130 aJ for the 1×2 switch ($V_{Drive}$=1.4 V) and 1×1 switch ($V_{Drive}$=0.2 V), respectively. Please note these driving voltages result in complete switching between constructive and destructive interference (ER>20 dB), while other works reporting attojoule switching energy are limited to ER≈3 dB. Overall, the power consumption ($U_{switch} \cdot f_{switch}$) of the 1×2 switch and 1×1 switch is ≈600 nW and ≈12 nW, respectively, assuming future switching frequencies of 100 MHz.

Further optimization can be achieved by reducing the device capacitance. The device's capacitance consists of two parallel capacitors. One is formed by the alumina post at the center of the disc ($C_{post} \approx 2.4$ fF), while the other is formed by the air gap that encircles the alumina post ($C_{gap} \approx 2.3$ fF). Locally doping the silicon below the air gap (and not under the alumina post) would omit the alumina capacitor, and thus lower the device capacitance by a factor of 2. Furthermore, the device radius can be reduced by a factor of two without diminishing device performance. This reduces C by an additional factor of four and could give rise to an attojoule device capacitance.

Furthermore, the small device capacitance and driving voltage enable operation powered by a single gate transistor. Please, note the energy consumption of single gate transistors ranges from a few femtojoule down to hundreds of attojoule. Indeed, other switching effects are faster, however, we want to emphasize here that the electrical current (I) of a low power transistor ($I_{transistor}$) is about a few microamperes. This results in a charging time ($t_{charging} \approx C_{device}/I_{Transistor}$) of few nanoseconds to hundreds of picoseconds. And taking full advantage of fast (i.e. few picoseconds) electro-optic approaches (e.g. Pockels effect) requires multiple high power transistors operated in parallel.

The optoelectromechanical switches were fabricated on two silicon-on-insulator chips (340 nm Si device layer/2 μm SiO$_2$ buried oxide/725 μm Si substrate), with one chip having an intrinsic ≈10$^{15}$ cm$^{-3}$ p-type boron doping and the other ≈10$^{18}$ cm$^{-3}$ n-type phosphorus doping. This doping induces optical losses. These losses are small compared to the attenuation induced by Ohmic loss. The p-doped chip was used for passive optical characterization (e.g. Q-factor dependency versus waveguide-cavity separation). The n-doped chip was used solely for active measurements and to prevent any RC-limitations. In a first step, the silicon waveguides, grating couplers, contact pads with rails and disc resonators were patterned using hydrogen silsesquioxane (HSQ) resist with electron beam lithography (EBL: 100 keV) and etched using inductively-coupled-plasma reactive-ion-etching (ICP-RIE). The waveguides were fully etched through the ≈340 nm Si layer, whereas the ≈70 nm-high Si contact pad and rail were partially etched using a second EBL and ICP-RIE step with AR-N as a resist. The electrical contact to the Si rail was deposited with electron-beam physical-vapor-deposition (EBPVD) of either ≈80 nm Au with ≈2 nm Ti adhesion layer for the p-doped chip or ≈80 nm Ni for the n-doped chip. Both steps used EBL with a polymethyl methacrylate (PMMA)/methyl methacrylate (MMA) double layer resist and lift-off processes. Additionally, the Ni—Si contact was annealed in a rapid thermal annealing system to form a silicide (90 s at 450° C.). In a next step, ≈40 nm of Al$_2$O$_x$ was grown over the whole chip using atomic layer deposition (ALD) to define the dielectric post height. The ≈40 nm-thin Au top disc of the resonator was deposited using the previously mentioned EBL, EBPVD and lift-off process. To contact the Au discs on top of the resonators, suspended air bridges and contact pads were built of ≈500 nm Au/≈5 nm Ti (EBL, EBPVD, lift-off), using a sacrificial spacer layer below the bridges. Finally, the discs and bridges were released by chemical wet etching of the Al$_2$O$_x$ with phosphoric acid and subsequent critical point drying to avoid irreversible sticking of the discs. The etch duration was calibrated such that it resulted in the desired undercut beneath the Au disc (typically≈1 μm). The short under etch is beneficial as it reduces the upbending of the gold foil due to intrinsic stress. This normally constitutes a challenge for large-scale structures.

Residual stress induced an upwards bending of ≈10 nm to 20 nm of the gold foil during the fabrication of the p-doped chip. The n-doped chip did not suffer from the same bending because an additional ALD layer of 5 nm $SiO_x$ was grown on top of the Au disc. This counteracted the previously induced stress of the $Al_2O_x$—Au interface at the bottom side of the Au disc. The SiOx was removed afterwards by wet etching with hydrofluoric acid. However, this adjustment limited the disc resonator yield to <5% as the devices were more susceptible to pull-in events triggered by chip handling during fabrication. This prevented us from actively testing multiple 1×2 switches sharing the same through port waveguide. Future optimization of the fabrication process promises to overcome this issue. The cross-section shown in FIG. 2B was prepared by focused-ion-beam milling. Low ion currents were required to prevent destruction of the thin Au disc due to stress-induced bending by the gallium ions.

The optical response of the hybrid resonators was determined by utilizing cut-back measurements of similar photonic waveguide circuits that were not coupled to a resonator. The passive photonic circuit elements used to couple and guide light comprised of air-cladded TM grating couplers (pitch: 680 nm/duty cycle: 0.63/etch depth: 140 nm/efficiency per coupler: −14 dB) and photonic waveguides (width: 450 nm/height: 340 nm/propagation loss (n-doped): >1 dB/mm) of equal dimensions but without the hybrid resonators. The spectral responses were obtained by using tunable laser sources electrically connected to an optical power meter (power range 1 pW to 10 mW) to trigger the measurements while performing wavelength sweeps (1465 nm to 1635 nm). The optical input power to the chip was limited to ≈−0.3 mW to ensure that thermal tuning of the resonances was suppressed. Thermal tuning of the resonances could be observed for optical input power of >10 mW for the high Q-devices (gap≈55 nm). Typical thermal tuning of photonic and plasmonic disc and ring resonators is 200 pm/K-300 pm/K. This is well below the voltage tunability of the NOEMS switches (10 nm/V) enabling a "power-less" thermal compensation.

The static electro-optic characterization was performed by using the same optical setup-up in tandem with picoprobes to electrically connect the devices to a precision voltage source via the ≈50 μm by ≈50 μm contact pads. The ground contact was chosen to be on the top Au disc and the signal was applied to the bottom Si disc via the rail. The pull-in voltage was determined by increasing the applied bias voltage stepwise and measuring the optical spectrum in between steps. Upon pull-in the Ohmic loss increased by orders of magnitude. This reduces the ER of the resonance because the critical coupling condition is no longer fullfilled. No static current (<1 nA) was measured prior to pull-in, confirming the low-power consumption of electro-opto-mechanical switches.

The dynamic electro-optic response was characterized by using an RF-synthesizer (frequency range 9 kHz to 40 GHz; $P_{output}$≈60 mV) in combination with a high-speed photodiode (InGaAs $f_{3dB}$=5 GHz). Furthermore, an erbium-doped-fiber amplifier was used to amplify the modulated light to match the power requirements of the photodiode. The laser wavelength was fixed to the quadrature (3 dB) point of the corresponding optical resonance. The advanced driving signal was generated with an arbitrary wave form generator (frequency range: DC to 30 MHz). All the above-mentioned experiments were performed under ambient atmosphere. Two device generations were made, and FIG. 25 lists design parameters and material properties used in the calculations and simulations.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. An optoelectromechanical switch for programming an optical network, the optoelectromechanical switch comprising:
    an isolation substrate;
    an optical feedline disposed on the isolation substrate in optical communication with an electrically conductive high-index optical waveguide and that receives resonator light that is subject to optical communication to a resonator when a cavity length of the resonator supports an electromagnetic mode at the wavelength of the resonator light;

a resonator comprising:
  a low refractive index optical layer disposed on the isolation substrate, comprising an electrically conductive high-index optical waveguide that:
    receives the resonator light from optical feedline when the cavity length of the resonator supports an electromagnetic mode at the wavelength of the resonator light,
    does not receive the resonator light from optical feedline when the cavity length of the resonator does not support an electromagnetic mode at the wavelength of the resonator light, and
    receives substrate electrical counter potential to be electrically biased at the substrate electrical counter potential;
  a non-conductive spacer disposed on the low refractive index optical layer and that spaces apart the electrically conductive high-index optical waveguide from an electrically conductive membrane to provide a cavity length of the resonator;
  the electrically conductive membrane disposed on the non-conductive spacer, such that that non-conductive spacer is interposed between the low refractive index optical layer and the electrically conductive membrane, such that the electrically conductive membrane:
    receives a membrane electrical potential to be electrically biased at the membrane electrical potential, and
    deflects toward and away from the electrically conductive high-index optical waveguide based on a difference in potential between the membrane electrical potential and the substrate electrical counter potential;
  the cavity length that is variable and under electromechanical control of the deflection of the electrically conductive membrane based on the difference between the membrane electrical potential and the substrate electrical counter potential.

2. The optoelectromechanical switch of claim 1, further comprising a power source in communication with the low refractive index optical layer and the electrically conductive membrane and that provides the membrane electrical potential to the electrically conductive membrane and the substrate electrical counter potential to the low refractive index optical layer.

3. The optoelectromechanical switch of claim 2, further comprising a counter electrode disposed on the isolation substrate and in electrical communication with the low refractive index optical layer and that receives the substrate electrical counter potential and communicates the substrate electrical counter potential to the low refractive index optical layer.

4. The optoelectromechanical switch of claim 1, wherein the electrically conductive membrane comprises a plasmonic metal.

5. The optoelectromechanical switch of claim 4, wherein the plasmonic metal comprises gold, copper, silicon, aluminum, or tin.

6. The optoelectromechanical switch of claim 1, wherein the low refractive index optical layer comprises silicon.

7. The optoelectromechanical switch of claim 1, wherein the resonator is configured as a ring resonator, linear resonator, or a phase shifter.

8. The optoelectromechanical switch of claim 1, wherein the optical feedline comprises a high-k dielectric.

9. The optoelectromechanical switch of claim 1, further comprising a conductive two-dimensional electrode disposed on the low refractive index optical layer and that receives the substrate electrical counter potential and capacitively couples to the electrically conductive membrane.

10. The optoelectromechanical switch of claim 9, further comprising a high-k member disposed on the conductive two-dimensional electrode and interposed between the conductive two-dimensional electrode and the electrically conductive membrane.

11. A process for programming an optical network with the optoelectromechanical switch of claim 1, the process comprising:
  receiving, by the optical feedline, resonator light;
  electrically biasing the low refractive index optical layer at the substrate electrical counter potential;
  electrically biasing the electrically conductive membrane at the membrane electrical potential;
  changing the cavity length based on the potential difference between the membrane electrical potential of the electrically conductive membrane and the substrate electrical counter potential of the low refractive index optical layer; and
  optically communicating the resonator light from the optical feedline to the resonator when the cavity length of the resonator supports an electromagnetic mode at the wavelength of the resonator light.

* * * * *